(12) United States Patent
Miller et al.

(10) Patent No.: US 12,093,794 B1
(45) Date of Patent: Sep. 17, 2024

(54) EDUCATION LEARNING ENVIRONMENT AND METHODS FOR USING SAME

(71) Applicant: MobileMind Technologies, Inc., Atlanta, GA (US)

(72) Inventors: Tyce Miller, Ponte Vedra Beach, FL (US); Amy Vitala, Denver, CO (US); Bartram Nason, Chicago, IL (US); Roger Daniel Stevens, Douglasville, GA (US); Christopher Richardson, Atlanta, GA (US); Kyle Williams, Atlanta, GA (US)

(73) Assignee: MobileMind Technologies, Inc., Atlanta, GA (US)

( * ) Notice: Subject to any disclaimer, the term of this patent is extended or adjusted under 35 U.S.C. 154(b) by 0 days.

(21) Appl. No.: 17/840,853

(22) Filed: Jun. 15, 2022

Related U.S. Application Data

(60) Provisional application No. 63/245,254, filed on Sep. 17, 2021, provisional application No. 63/211,305, filed on Jun. 16, 2021.

(51) Int. Cl.
  *G06N 20/00* (2019.01)
  *G06F 40/40* (2020.01)
(52) U.S. Cl.
  CPC ............ *G06N 20/00* (2019.01); *G06F 40/40* (2020.01)
(58) Field of Classification Search
  CPC ................................ G06N 20/00; G06F 40/40
  See application file for complete search history.

(56) References Cited

U.S. PATENT DOCUMENTS

| 6,262,730 B1 * | 7/2001 | Horvitz .................... | G06N 5/00 715/707 |
| 2014/0220537 A1 * | 8/2014 | Dohring ................... | G09B 5/06 434/350 |
| 2015/0147741 A1 * | 5/2015 | Spagnola ................. | G09B 7/04 434/362 |

(Continued)

OTHER PUBLICATIONS

Vitala, Amy E. "From# edcamp to# edchat: A case study exploring innovative, self-directed educator professional learning." (2016). (Year: 2016).*

*Primary Examiner* — Casey R. Garner
(74) *Attorney, Agent, or Firm* — Morris, Manning & Martin, LLP; Adam J. Thompson, Esq.

(57) ABSTRACT

A training system for professional development is disclosed herein. The training system courses for using at least one of: a target application and a web browser. The training system includes a computing device in communication with a data store, where the computing device is configures to determine, via a software extension, that the course is in progression on the computing device. The computing device can determine steps associated with the tutorial of the particular course. The computing device can monitor inputs into input fields associated with the tutorial of the particular course. The computing device can determine an exceeded failure threshold for a particular step of the steps based on at least one input. The computing device can generate at least one instruction for completing the particular step based on training data. The computing device can render at least one instruction on a display of at least one computing device.

20 Claims, 19 Drawing Sheets

(56) References Cited

U.S. PATENT DOCUMENTS

| | | | |
|---|---|---|---|
| 2016/0191338 A1* | 6/2016 | Sankaranarasimhan | G06F 3/04842 715/738 |
| 2017/0084189 A1* | 3/2017 | Rubalcaba | G09B 7/04 |
| 2020/0160740 A1* | 5/2020 | Nedivi | H04L 67/535 |
| 2022/0114900 A1* | 4/2022 | Qiu | G09B 7/02 |

* cited by examiner

FIG. 8

Mobilemind hq REPORTS CONTENT SYNC ACCOUNTS [Switch To Learn] SMITH SCHOOL DISTRICT VIEW HQ RULES Jane Deo ☐ Edit Course ⌕ PREVIEW ＜ SHARE 🗐 COPY 💾 SAVE

Jane Doe: Adding Videos from TubeYou

Maximum Length is 50 characters ⓘ What makes a great course?

Learn
In this course, you will learn how to find a Tubeyou video that you could use with PuzzleEd and how to add questions to it. Before you begin using PuzzleEd, please make sure you check with your IT Department and make sure this an approved website. You will find a link to PuzzleEd information on obtaining parent permission along with forms you can use A brief description of what the learner will have learned after completing this course. This text appears on the course card throughout the app.
Apply
After watching video, find a TubeYou video that you would use with you students and add some questions to it. After doing so, you will answer a multiple choice question.

Explain what the learner will be actually be doing in this course
Video
https://www.tubeyou.com/watch?v=EqRqMh8quYg Enter the URL for a video to include. TubeYou videos are currently supported. Note: copy and paste the URL to view the video, do not use share button ☐ Archived
CATEGORY
◉ District ▽
DISTRICT CATEGORY
◉ Technology ▽
⊕ ADD SECONDARY CATEGORY
≡ MANAGE CATEGORY
SKILL LEVEL
★ ★ ☆
ESTIMATED TIME
⏱ 15 minutes
RELATED COURSES
Search for Courses
COURSES OWNER
Org - School District ▽

☐ Open-ended question ⓘ Watch Later  Share
B I U X □ ☒
Why were women starting to take jobs in factories after the war started?

FIG. 10

| Mobilemind hq REPORTS CONTENT SYNC ACCOUNTS [Switch To Learn] | | Jane Deo SCHOOL DISTRICT VIEW HQ RULES | |
|---|---|---|---|
| Your Courses Community | Community Courses | | |
| FILTER COURSES RESET | MobileMind has not reviewed the micro-courses listed or videos shared within. Please micro-course before choosing to publish it to the learners in your organization. Additionally, your organization will be responsible for reviewing (non-automated) micro-courses that are copied and published from the MobileMind community. | | |
| Search | | | |
| Category Any ▽ | ↑88 COURSES | ESTIMATED TIME | CONTRIBUTOR STATE CREATED |
| Source Community ▽ | Meet Breakout Rooms COMMUNITY CONTRIBUTOR | 8 min | GA 16/6/2021 |
| Contributor State Any ▽ | EcPuzzle 3: Adding Videos from Tube You COMMUNITY CONTRIBUTOR | 15 min | GA 8/23/2021 |
| SORT COURSES | Podnear A: Why is Podnear Great? COMMUNITY CONTRIBUTOR | 8 min | GA 8/11/2021 |
| Sort By Times Completed ▽ | EcPuzzle 2: Adding Videos from the EP Community COMMUNITY CONTRIBUTOR | 12 min | GA 8/23/2021 |
| | EcPuzzle 4: Adding Videos You Created COMMUNITY CONTRIBUTOR | 20 min | GA 8/23/2021 |
| | Teesaw A: An Intro COMMUNITY CONTRIBUTOR | 10 min | GA 7/29/2021 |
| | Sanvac I: Commons COMMUNITY CONTRIBUTOR | 10 min | 8/12/2021 |
| | Pod Near C: Learner participation COMMUNITY CONTRIBUTOR | 5 min | 8/11/2021 |

EDUCATION LEARNING ENVIRONMENT AND METHODS FOR USING SAME

CROSS-REFERENCE TO RELATED APPLICATIONS

This application claims the benefit of, and priority to, U.S. Provisional Patent Application No. 63/245,254, entitled "EDUCATION LEARNING ENVIRONMENT AND METHODS FOR USING SAME" and filed Sep. 17, 2021, and U.S. Provisional Patent Application No. 63/211,305, entitled "EDUCATION LEARNING ENVIRONMENT AND METHODS FOR USING SAME" and filed Jun. 16, 2021, the disclosures of which are each incorporated herein by reference in their entireties.

TECHNICAL FIELD

The present apparatuses, systems, and methods relate generally to professional development services and more specifically to a centralized learning environment for managing, performing, and creating classes, lessons, and meetings for third party applications and websites.

BACKGROUND

Professional development services have been increasingly useful tools for school districts and teaching environments around the world. In an age where electronic resources have dominated the forefront of current classroom innovations, teachers, school districts, and school administrators have had to adapt to the changing atmospheres inside and out of the classroom. Part of educators constant evolution requires learning new software and web services to augment the classroom experience for students. Although services provide resources for its users, these resources are disparate and are not united into one system with a holistic solution for critical professional development needs. Furthermore, the resources are non-interactive and do not provide proper feedback to users. In addition, the resources lack oversight for insuring the completion and thorough understanding of concepts related to these services. Administrators lack visibility, as well as tracing and reporting required for ensuring proper training for educators.

Since the proliferation of new mobile and cloud technologies, teachers have struggled with effective utilization of current teaching solutions. Ultimately, traditional means of training teachers falls short in the face of the pace and complexity of new technologies. Legacy "professional development systems" serve more as content repositories where the end user consumes fixed content and potentially answers a multiple choice questionnaire. Shareable Content Object Reference Model (SCORM) is the standard for the previous generation and is ineffective for training teachings in the current age, particularly with regard to mobile and cloud technologies Therefore, there is a long-felt but unresolved need for a system method that unites learning environments to monitor and enhance the training of educators for a variety of classroom services as well as that provides an interactive system for educators to take lessons related to learning new skills, software's, and education systems.

BRIEF SUMMARY OF THE DISCLOSURE

Briefly described, and according to one embodiment, aspects of the present disclosure generally relate to devices, articles, apparatuses, systems, and methods for enhancing electronic learning environments and professional development resources for educators. In particular embodiments, the disclosed system described herein refers to systems, processes, and methods for developing learning environments for various technologies and applications. In one or more embodiments, the disclosed system produces learning environments for web-based technology systems (also referred to herein as "web browser"). Some examples of web-based technology systems include, but are not limited to, Google Drive, Google Docs, Google Slides, and Google Drawings. In various embodiments, the learning environments can be created for native applications (also referred to herein as "target applications") installed onto a user's client device. Some examples of native applications include, but are not limited to, Adobe Photoshop, Microsoft teams, and Microsoft Visio. In some embodiments, the native applications can be developed to provide functionality or provide representative features of various third-party applications and technologies, such as, but are not limited to, Adobe Photoshop, Microsoft teams, and Microsoft Visio. A learning environment can be defined as a learning tool that teaches users how to use particular applications and/or web-based technology systems. A user can be defined as a student, teacher, organization, school district, or any other client learning how to use a particular application or web-based system.

In at least one embodiment, the learning environment includes a course management system that allows users to complete course associated with the native applications and/or the web based technology systems. The learning environment can include a software extension (also referred to herein as a "web extension") to surface lessons, tutorials, and/or course related to the native application and/or the browser extension. The software extension can provide help, guide users, monitor users, and develop feedback related to the course and the lesson at hand.

In at least one embodiment, the learning environment can create a community portal for integrating professional development resources across one or more school districts. In various embodiments, users can synchronize courses amongst devise, share courses amongst users, deliver asynchronous and synchronous courses, design self made courses, and use any other feature associated with the disclosed system.

According to a first aspect, a training system, comprising: A) a data store comprising training data for a plurality of courses, a particular course of the plurality of courses comprising a tutorial for using at least one of: a target application and a web browser; and B) at least one computing device in communication with the data store, the at least one computing device being configured to: 1) determine, via a software extension, that the tutorial of the particular course is in progression on the at least one computing device; 2) determine a plurality of steps associated with the tutorial of the particular course; 3) monitor, via the software extension, for at least one input into at least one of: a plurality of input fields associated with the tutorial of the particular course; 4) determine, via the software extension, a failure threshold has been exceeded for a particular step of the plurality of steps based on the at least one input; 5) generate at least one instruction for completion of the particular step based on the training data; and 5) render, via the software extension, the at least one instruction on a display of the at least one computing device.

According to a further aspect, the training system of the first aspect or any other aspect, wherein the at least one computing device is further configured to: A) determining that the tutorial of the particular course is in progression; and B) in response to determining that the tutorial is in progression, extract the training data from the data store.

According to a further aspect, the training system of the first aspect or any other aspect, wherein the at least one computing device is further configured to: A) identify a user account associated with the at least one computing device; and B) determine that the tutorial of the particular course is in progression by the user account.

According to a further aspect, the training system of the first aspect or any other aspect, wherein the at least one computing device is further configured to: A) determine that the plurality of steps have been successfully finished; B) mark the particular course as finished by the user account in the data store.

According to a further aspect, the training system of the first aspect or any other aspect, wherein the at least one computing device is further configured to: A) analyze a plurality of inputs associated with the plurality of steps based on the training data to generate at least one grading score for the particular course; and B) assign a course completion grade to the particular course for the user account based on the at least one grading score.

According to a further aspect, the training system of the first aspect or any other aspect, wherein the training data further comprises at least one of: test data, user usage data, HTML files, JSON files, scripts, and lesson data.

According to a further aspect, the training system of the first aspect or any other aspect, wherein the software extension comprises a browser extension and the tutorial is performed via the web browser.

According to a further aspect, a method, comprising: A) determining, via a software extension executed by at least one computing device, that a tutorial of a particular course of a plurality of courses is in progression on the at least one computing device; B) determining, via the at least one computing device, a plurality of steps associated with the tutorial of the particular course; C) monitoring, via the software extension, for at least one input into at least one of: a plurality of input fields associated with the tutorial of the particular course; D) determining, via the software extension, a failure threshold has been exceeded for a particular step of the plurality of steps based on the at least one input; E) generating, via the at least one computing device, at least one instruction for completion of the particular step based on training data for the plurality of courses; and F) rendering, via the software extension, the at least one instruction on a display of the at least one computing device.

According to a further aspect, the method of the second aspect or any other aspect, further comprising rendering at least one comment related to the particular step from a human grader on the display.

According to a further aspect, the method of the second aspect or any other aspect, further comprising: A) analyzing, via the at least one computing device, a plurality of finished courses of the plurality of courses associated with a user account; and B) generating, via the at least one computing device, at least one recommended course of the plurality of courses based on the plurality of finished courses.

According to a further aspect, the method of the second aspect or any other aspect, further comprising: A) training, via the at least one computing device, a machine learning model using historical data comprising a plurality of sets of finished courses individually associated with a respective one of a plurality of user accounts; and B) generating, via the at least one computing device, a plurality of scores individually corresponding to a respective one of a plurality of unfinished course for the user account by applying the machine learning model, wherein the at least one recommended course is generated based on the plurality of scores.

According to a further aspect, the method of the second aspect or any other aspect, further comprising generating at least one learning path comprising a recommended plurality of sequential courses of the plurality of courses for the user account.

According to a further aspect, the method of the second aspect or any other aspect, further comprising collecting, via the software extension, the at least one input by communicating with at least one target application or a web extension via an application programming interface (API).

According to a further aspect, the method of the second aspect or any other aspect, further comprising: A) generating, via the at least one computing device, a sharable schedule for the particular course; and B) sending, via the at least one computing device, the sharable schedule to at least one second computing device for the at least one second computing device to finished the particular course.

According to a third aspect, a non-transitory computer-readable medium embodying a program that, when executed by at least one computing device, causes the at least one computing device to: A) determine that a tutorial of a particular course of a plurality of courses is in progression on the at least one computing device; B) determine a plurality of steps associated with the tutorial of the particular course; C) monitor for at least one input into at least one of a plurality of input fields associated with the tutorial of the particular course; D) determine a failure threshold has been met or exceeded for a particular step of the plurality of steps based on the at least one input; E) generate at least one instruction for completion of the particular step based on training data for the plurality of courses; and F) render the at least one instruction on a display of the at least one computing device.

According to a further aspect, the non-transitory computer-readable medium of the third aspect or any other aspect, wherein the program further causes the at least one computing device to: A) subsequent to rendering the at least one instruction, determine a second failure threshold has been met or exceeded for the particular step; and B) in response to the second failure threshold being met or exceeded, perform at least one action to assist in completing the particular step on behalf of a user account.

According to a further aspect, the non-transitory computer-readable medium of the third aspect or any other aspect, wherein the at least one action comprises at least one of: moving a mouse cursor, entering a series of key strokes, and rendering at least one indicator on the display.

According to a further aspect, the non-transitory computer-readable medium of the third aspect or any other aspect, wherein the program further causes the at least one computing device to determining an interaction with a particular user interface component in a user interface necessary to finished the particular step, wherein the at least one action comprises rendering an overlay of the interaction with the particular user interface component.

According to a further aspect, the non-transitory computer-readable medium of the third aspect or any other aspect, wherein the program comprises a browser extension associated with a web browser.

According to a further aspect, the non-transitory computer-readable medium of the third aspect or any other aspect, wherein the program further causes the at least one computing device to generate a grade for the particular course in response to determining that a user account indicates that the plurality of steps have been finished.

These and other aspects, features, and benefits of the claimed innovation(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 8 illustrates a user interface of an event creation portal, according to one embodiment of the present disclosure;

FIG. 10 illustrates a user interface of a course creation page, according to one embodiment of the present disclosure;

FIG. 11 illustrates a user interface for a community portal, according to one embodiment of the present disclosure;

FIG. 15 illustrates a user interface of a course page, according to one embodiment of the present disclosure;

FIG. 16 illustrates a user interface of an in-progress course, according to one embodiment of the present disclosure;

FIG. 17 illustrates a user interface of a completed course, according to one embodiment of the present disclosure;

FIG. 18 illustrates a user interface of a dashboard, according to one embodiment of the present disclosure.

DETAILED DESCRIPTION

Figure 1:
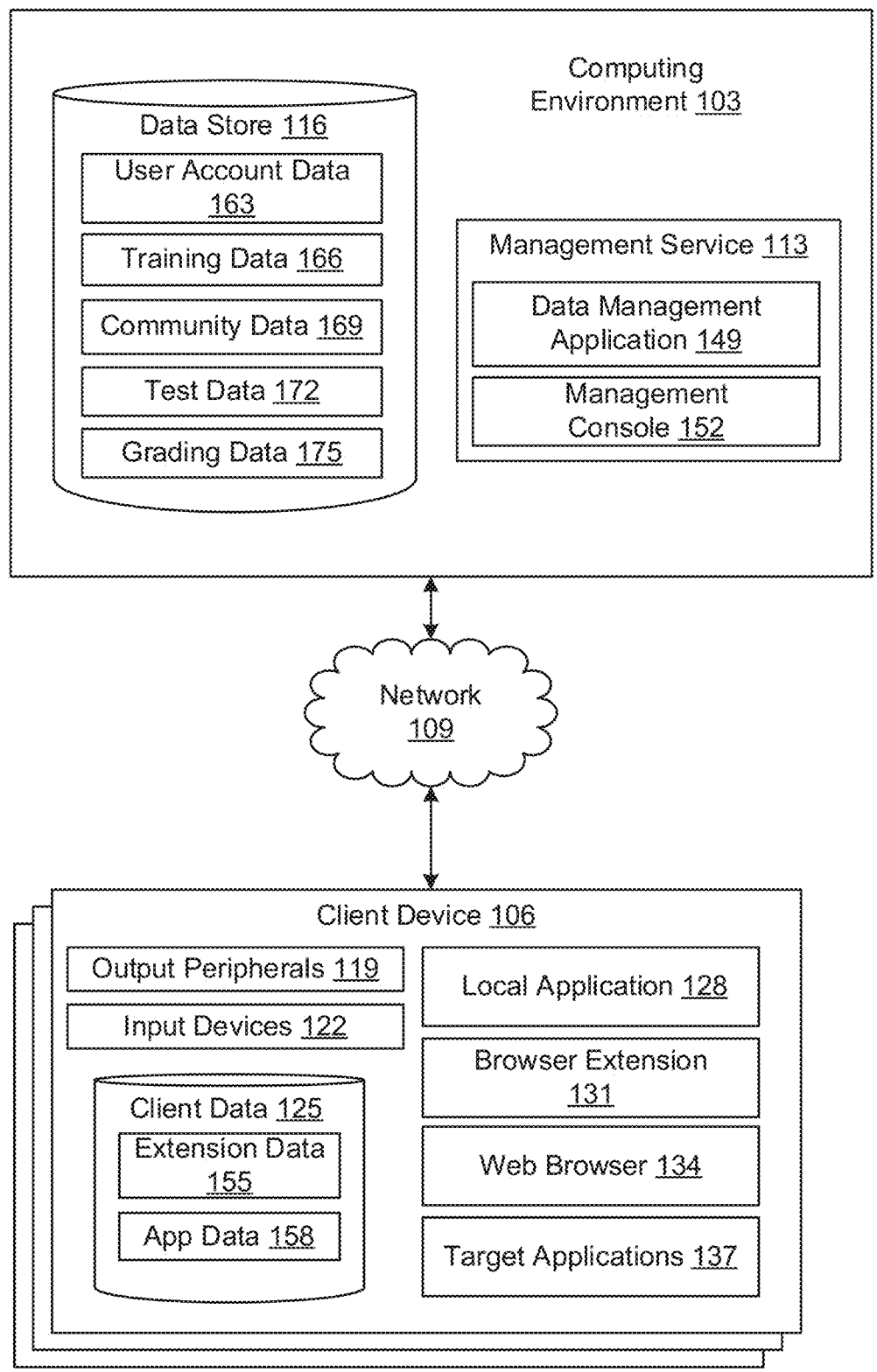
FIG. 1 illustrates a networked environment, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

In particular embodiments, the disclosed system described herein refers to systems, processes, and methods for developing learning environments for various technologies and applications. In some embodiments, the disclosed system employs techniques derived from Adult Learning Theory (ALT) to maximize the effectiveness of training educators through a technology based platform. In one or more embodiments, the disclosed system produces learning environments for web-based technology systems (also referred to herein as "web browser"). Some examples of web-based technology systems include, but are not limited to, Google Drive, Google Docs, Google Slides, and Google Drawings. In various embodiments, the learning environments can be created for native applications (also referred to herein as "target applications") installed onto a user's client device. Some examples of native applications include, but are not limited to, Adobe Photoshop, Microsoft teams, and Microsoft Visio. In some embodiments, the native applications can be developed to provide functionality or provide representative features of various third-party applications and technologies, such as, but are not limited to, Adobe Photoshop, Microsoft teams, and Microsoft Visio. A learning environment can be defined as a learning tool that teaches users how to use particular applications and/or web-based technology systems. A user can be defined as a student, teacher, organization, school district, or any other client learning how to use a particular application or web-based system.

In some embodiments, the learning environment can include a user interface that interacts with a particular web browser or an application. In various embodiments, the user interface is created as a plug-in for a particular application or web browser. In at least one embodiment, a plug-in is an extension feature, which allows a plug-in creator to add extra functionality to a particular application or web browser. An example plug-in can be a Google Chrome extension. A learning environment can employ a computing environment that manages and processes data for the disclosed system.

The plug-in can be designed by a user or created by the system designer to integrate a learning environment into a particular application and/or web-based system. In one or more embodiments, the plug-in can provide users continuous access to education tools while they learn how to interact with an application or web-based system. These education tools can include, learning paths, lessons, tutorials, courses, tests, grade results, account data, and/or any other tool used to train the user how to use an application or web-based system.

In particular embodiments, learning paths are subsets of similar courses that provide the user a consistent set of lessons that relate to the same subject, application, and/or web-based system. In various embodiments, this allows the user to gain knowledge about an application and/or web-based system by practicing consistently taught material. The learning paths can include enhanced educational tools to aid the user in their learning process. In one or more embodiments, the user's credentials (e.g., job title, learning goals, and proficiency with technology) allows the learning environment to produce a tailored learning path for the particular user. A learning path can further include recommendations, progress bars, and constant reminders to encourage users to continue their learning experience. A learning path can also be associated with a deadline, set by the user or an administrator, to encourage a user to complete their desired training. In some embodiments, a particular learning path can be designated as a prerequisite for another learning path, requiring the user to complete the first learning path before moving on to the next one. In at least one embodiment, the learning paths are presented through the plug-in to show users their learning progress. The system can recommend courses based on metadata (e.g., courses in a same category) associated with one or more submitted course, one or more recently completed courses, or one or more historical course completed by the user. In some embodiments, the recommends are provided if a user has no open learning paths or goals.

An individual lesson can be taught through the plug-in of a particular application and/or web-based system. The lessons demonstrated through the plug-in can provide the user an interactive method for learning the functionality of an application and/or a web-based system. For example, a plug-in dialog box is present in the corner of a Google Drive webpage teaching the user how to convert a word document to a PDF. Continuing this example, if the user takes particularly long on one step of the lesson, the plug-in can provide further assistance to teach the user how to convert the desired document.

When a user completes a lesson, the plug-in can prompt the user to take a test to assess the skills they have learned. As soon as the user completes the test, the plug-in sends the data to the computing environment for grading. Grading can be conducted by the computing environment automatically, or can be passed to a human grader for correctness. Tests types can include, but are not limited to, computer-based exams, oral exams, recorded exams, written exams, multiple-choice exams, and drawing exams. In one or more embodiments, once the automatic grading system and/or the human grader has determined the score for the exam, the results are returned to the user. In one embodiment, if the user has performed sufficiently enough to pass the lesson, the user can continue to the next lesson in the learning path. In another embodiment, the user can perform any lessons and the learning path can be provided to the user as a guide for training. In some embodiments, based on the performance of the user, the learning environment can recommend new lessons for the user to complete.

The learning environment can also include an interactive feature that allows fellow users to communicate and share their resources across platforms. Users can create their own learning environments, edit current learning environments, or recommend new learning environments to share amongst the community. In particular embodiments, users edit and create learning environments specific to their needs and share them amongst their peers.

Exemplary Embodiments

With reference to FIG. 1, shown is a networked environment 100 according to various embodiments of the present disclosure. The networked environment 100 includes a computing environment 103, and a client device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, Bluetooth networks, Wi-Fi networks, NFC networks, and other types of networks.

The computing environment 103 can include, for example, a server computer or any other system providing computing capability. Alternatively, the computing environment 103 can employ more than one computing devices that can be arranged, for example, in one or more server banks or computer banks or other arrangements. Such computing devices can be located in a single installation or can be distributed among many different geographical locations. For example, the computing environment 103 can include one or more computing devices that together can include a hosted computing resource, a grid computing resource and/or any other distributed computing arrangement. In some cases, the computing environment 103 can correspond to an elastic computing resource where the allotted capacity of processing, network, storage, or other computing-related resources can vary over time.

Various applications and/or other functionality can be executed in the computing environment 103 according to various embodiments. The computing environment 103 can include a management service 113 and a data store 116. The management service 113 can be used to distribute and analyze data stored in the data store 116. Various data is stored in a data store 116 that is accessible to the computing environment 103. The data store 116 can be representative of one or more of data stores 116 as can be appreciated. The data stored in the data store 116, for example, is associated with the operation of the various applications and/or functional entities described herein.

The management service 113 can execute a variety of applications for organizing and analyzing data. The management service 113 can include a data management application 149 and a management console 152. In various embodiments, the management service 113 acts as the main processing unit of the computer environment 103.

The data management application 149 can distribute data to the data store 116. In particular embodiments, the data management application 149 processes the data and determines where data should be stored accordingly. For example, the data management application 149 can distribute test data of a particular user to their respective test data 172 repository.

The management console 152 can include processing software designed to analyze the data distributed within the data store 116. The processing software of the management console 152 can include, but is not limited to, machine learning processing systems, natural language processing system, statistical algorithm processing systems, and data analysis techniques. In particular embodiments, the processing systems described herein are used by the management console 152 to create recommendations for the user's training regimen, grading the user's test results, process data regarding the user's interaction with the disclosed system, and build new learning environments based on a user's input, amongst other uses. For example, the management console 152 can use the natural language processing system to grade correctness based on a comparison between the user's test results and the prescribed test solutions. Continuing this example, the management console 152 can use the natural language processing system to grade based on keyword similarities and/or phrase and sentence structure similarities. Furthering this example, the management console 152 can use the natural language processing system to determine the context of the information in the test results and determine correctness by matching these contexts to preregistered solutions.

Another example process executed by the management console 152 can include using the machine learning processing system to create recommendations for future classes or modules that a user should take. Continuing this example, the management console 152 can employ various machine learning algorithms (e.g., random forest, AdaBoost, support vector machines (SVM), linear regression) to train, create, and test models for particular class designations. In various embodiments, these designations will allow the management console 152 to recommend an appropriate course of action for a user. Furthering this example, after a user completes a lesson on embedding a video into a Google Slides presentation, the management console 152 can recommend the user to take a lesson on embedding audio into a Google Slides presentation.

In another example, the management console 152 can include a data analysis processing system to determine actions based on particular data. For example, the computing environment 103 can gather information regarding the time it takes a user to complete a particular lesson. Continuing this example, the management console 152 can determine a lesson to be too difficult for a particular user if they spend over an hour on that particular lesson. Furthering this example, the management console 152 can inform the computing environment 103 to include more examples to the user to help guide them through a difficult lesson.

Now referring to the data store 116, the data stored in the data store 116 can include, but is not limited to, user account data 163, training data 166, community data 169, test data 172, and grading data 175. The data stored in the data store 116 can include a plurality of various data entities.

The user account data 163 can include any information pertaining to a particular users account. This information can include, but is not limited to, the user's name, the user's age, the user's job position, the entity the user works for, the user's academic background, the login information for the user, and the technical proficiency of the user.

The user account data 163 can act as a base reference repository to link a particular user to a plurality of data entities. For example, a user can have grading data 175 that refers to their specific account. Continuing with this example, the grading data 175 can be linked to the user account data 163 of a specific user to maintain organization of the particular user's data.

The training data 166 can include any information pertaining to a particular user's training experience with the disclosed system. In particular embodiments, the training data 166 stores information regarding the current progress of the user's training. The training data 166 can include, but is not limited to, the user's training progress, the user's training goals, the tests the user has taken, and a track of the user's time per training segment. In some examples, the data aggregated in the training data 166 can be processed by the management console 152 to determine if a user is progressing through the training at an appropriate speed.

The community data 169 can include information of user-created lessons that can be shared amongst a plurality of users. In particular embodiments, the community data 169 includes, but is not limited to, user-created tests, user-created help section, user-created test solutions, courses, badges, learning paths, goals, events, test, and/or user-created application or extension plug-ins. In various embodiments, plug-ins are user interface (UI) systems used to incorporate new tools for particular applications or websites. For example, a user can create a new training set that teaches users how to use EasyEDA, a web-based tool designed to test, simulate, and create printed circuit boards. Continuing with this example, the community data 169 can include plug-ins that aid the EasyEDA learning experience.

The test data 172 can include information pertaining to a test for a specific lesson. In various embodiments, the tests data 172 can include, but is not limited to, test questions, test dialog, test requirements, and multiple choice test answers.

The grading data 175 can include any information pertaining to a particular users test performance. The grading data 175 can include, but is not limited to, a grade performance for a particular test, a time it took for a user to complete a test, the users correct answers, and the user's incorrect answers. In particular embodiments, the grading data 175 can be analyzed by the management console 152 to determine the performance of the user. For example, the management console 152 can use machine learning and natural language processing systems to grade the exam and provide feedback based on the performance of the user. In some embodiments, the grade data 175 can be exported to a human grader that grades the test for the user.

Now referring to the client device 106, the client device 106 is representative of a one or more client device that can be coupled to the network 109. The client device 106 can include, for example, a processor-based system such as a computer system. Such a computer system can be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 can include, but is not limited to, output peripherals 119, input devices 122, client data 125, a local application 128, a browser extension 131, a web browser 134, and a target application 137.

The output peripherals 119 can include any form of output device used by the client device 106. The output peripherals can include, but is not limited to, a display, speakers, a printer, a projector, and a touch screen display.

The input devices 122 can include a plurality of devices used to input data to a client device 106. In one or more embodiments, the input devices 122 can include a mouse, a keyboard, an electronic notepad, a touch screen input, a microphone, a web camera, and/or any other devices used to provide input data into a client device 106. For example, a keyboard can be used to type responses for a test proctored by the disclosed system.

The client data 125 can include any information pertaining to the activities performed and/or data collected by the client device 106. The client data 125 can include, but is not limited to, extension data 155 and app data 158. The extension data 155 can include any information pertaining to the plug-in used for the web browser 134 and/or the target application 137. For example, the extension data 155 can include, but is not limited to, scripts, JSON files, HTML files, user usage data, testing data, and lesson data. The app data 158 can includes any information pertaining to a local application 128 and/or a target application 137. In various embodiments, the app data 158 can include, but is not limited to, user-created learning environments, user data, test data, grading data, community data, and/or any sharable data between the computing environment 103 and the client device 106. For example, the local application 128 can store updated login information of a particular user in the app data 158. The client device 106 can communicate with the computing environment 103 through the network 109 to send and receive any pertinent data related to the disclosed system.

In particular embodiments, the local application 128 is an application controlled by the disclosed system used to manage the information and processes of the disclosed system locally on the client device 106. The local application 128 can be used to perform actions that integrated the learning environment locally on the client device 106. In various embodiments, the local application 128 can include learning video streaming software, API integration for local applications 128, user preferences for the local application and/or the browser extension 131, community services, lesson development interfaces, lesson history, lesson progress, and any other tool to enhance the learning environment of the user. In various embodiments, the local application 128 can be incorporated as an application installed onto the client device 106 and/or a web-based application accessible through a web browser 134.

In at least one embodiment, the local application 128 provides a user interface that allows users to track their account details. For example, a user accesses the local application to see test results, test history, progress reports, educational feedback, and any information pertaining to the learning progress and goals of the user.

In some embodiments, the local application 128 can allow users to change settings pertaining to their account. For example, a user can update their email, password, educational background, and/or any account data pertaining to the particular user. In some embodiments, the settings may be changed only be an administrative user account or empowered user account.

The local application 128 can further provide a space for users to create learning environments for their desired application or webpage. In various embodiments, the learning environment is defined as a structured system that provides a user with all the necessary tools to learn a particular lesson. The local application 128 can incorporate a learning environment creator that teaches individuals how to create their own lessons for a particular application or website. The learning environment creator of the local application 128 can include plug-in designing, test creating, solution creating, and any other tool used for creating a learning environment. For example, a user can create a plug-in, tests, and solutions that teaches users how to design flowcharts using Google Drawings. The local application 128 allows users to edit their creation and save the information locally to the client data 125 and/or on the data store 116 of the computing environment 103. The local application 128 can provide the ability for users to publish their learning environment to share amongst a plurality of other users through the community services. A user can employ the local application 128 to download user-created testing environments and/or original testing environments and edit them to accommodate for their specific needs. In particular embodiments, edited learning environments can be shared through the community services of the disclosed system.

The web extension 131 can include a plug-in designed to incorporate a learning environment into a web browser 134 for a particular website. In some embodiments, the web extension 131 can perform the same actions as the local application 128. In some embodiments, it can be appreciated that the functionality described herein with reference to the web extension 131 can include interaction with and various functionality being performed by or in coordination with the computing environment 103 or other software as described herein. The web extension 131 can include any training resources that integrate the lesson with the desired website. The web extension 131 can include, for example, help dialogs, test timers, screen recording, lesson videos, input locations, and/or any other tool used to promote the learning environment of a particular website. In various embodiments, the web extension 131 includes a user interface box that presents all the relevant tools and resources to the user directly in the web browser 134. The web extension 131 can be present throughout the entire learning process to guide the user accordingly. The web extension 131 can analyze the website and determine an appropriate lesson that corresponds with that specified website. The web extension 131 can further provide lesson recommendations for the user once the user has completed a lesson. The web extension 131 can provide further features allowing the user to change particular settings and account data related to their user account and testing environment. The web extension 131 can display community related information through the client device 106.

The web extension 131 can further perform grading tasks for the user. For example, after a user has completed a multiple-choice exam, the web extension 131 can submit the answers of the multiple-choice exam to the computing environment 103. Continuing with this example, the computing environment 103 can automatically processes results of the multiple-choice exam and produces grade results for the test. Furthering this example, the computing environment 103 can send the results of the multiple-choice exam to the client device 106 and displays the results through the local application 128 and/or the web extension 131. From the previous example, the user can determine appropriate action according to the results of their examination.

The web extension 131 can follow the user to any third party site to assist in the training process. For example, a particular lesson teaching a user how to embed a video into a Google Slides presentation may have a user navigate to a YouTube video page. Continuing with this example, the web extension 131 determines that the user has switched to the YouTube webpage and provides suggestions to the user that are relative to the YouTube page and the overall assignment of the lesson. Furthering this example, the web extension 131 can recommend the user to collect an embedded link for the desired video. Continuing this example, once the user has collected the embedded link, the user can switch back to the Google Slide webpage and the web browser extension 131 can continue to provide information regarding the lesson on how to embed a link in a Google Slides presentation.

The web extension 131 can further provide the user with guidance when navigating to a third party page. When a user completes a course, the web extension 131 can include a recommendation system for the particular user. In various embodiments, this recommendation system can include recommendation production by the management console 152 and display of the recommendation to the user through the web extension 131. Based on the goals, classes, and/or performance of the user, the web extension 131 can recommend a plurality of future courses. For example, if a user has an active goal, the web extension 131 can recommend the next courses in that goal category. A goal can be defined as a user determined learning outcome. In one or more embodiments, an example goal is learning how to use field codes in Google Docs. Each goal defined by the user can have particular deadlines associated with it. In another example, if the user has multiple goals, the web extension 131 can recommend the next courses in the goal with the nearest deadline. In another example, if the user does not have any goals, the web extension 131 can recommend the next course in the learning path of the user. Continuing this example, if the user has a variety of learning paths associated with their last competed course, the web extension 131 recommends the next course in the learning path closest to completion. In another example, if the user does not have any active learning paths and goals, the web extension 131 recommends a course similar to the subjects the user has learning about.

The web extension 131 can provide further feedback to the users. In particular embodiments, the web extension 131 can view the user's work while the document is in the background. The web extension can automatically move to the next lesson and/or test once the user has completed their current lesson and/or test. The web extension 131 can also provide full assessment history to a human grader to inform the disclosed system of the user's progress.

The web browser 134 can include any form of application used to access the World Wide Web. The web browser 134 can access a particular website by searching a specific uniform resource locator (URL). A web browser 134 can include a plurality of web browsers. Some examples of a web browser 134 can include, but is not limited to, Google Chrome, Apple Safari, Mozilla Firefox, and Microsoft Edge. In particular embodiment, the web browser 134 includes resources and an API tool to incorporate a web extension 131 into its respective system.

The target applications 137 can include one or more applications that incorporates a learning environment that teaches a user the particular application's functionality. The target applications 137 can include applications that are not native to a web browser 134. In some embodiments, installation of the target applications 137 can be required as individual applications on the client device 106. Some examples of target applications 137 can include, but are not limited to, Microsoft Word, Microsoft Teams, Adobe Reader, Adobe Acrobat, Adobe Photoshop, and National Instruments MultiSIM. The target applications 137 can include API that allow users to create plug-ins for any particular learning environment specific to the target application 137. In some embodiments, the target applications 137 can provide exemplary features of a third-party application for training purposes. The target application 137 can provide tutorial and training information to a user while learning the exemplary features.

Next, a general description of the operation of the various components of the networked environment 100 is provided. To begin, the computing environment 103 can provide the user with automated and/or human based feedback. The method of feedback chosen by the computing environment 103 can depend on various factors. Some factors determined by the computing environment 103 can include, but are not limited to, the type of exam a user submits and the number of attempts the user has taken on particular questions. In one example, if the user gets the correct answer the first time, the computing environment 103 provides the user with automated feedback. Continuing with this example, if the user requires two or more attempts at the exam, then the computing environment 103 provides the user with human based feedback. The computing environment 103 can share the feedback with the user through the client device 106.

In another example, the computing environment 103 uses human based feedback when the test submission type is either a text, URL, and/or image. Continuing with this example, when a user submits a challenge it goes in a queue for review by a human grader. Continuing with this example, when a human grader clicks on a submission, the web extension 131 appears on top of the web browser 134. Continuing with this example, if the user submits a URL, the browser will automatically navigate to the URL. Continuing with this example, if the user submits an image, the image will appear in the background. Continuing with this example, once the human grader has access to these resources, they can grade the test submission and provide feedback accordingly.

For human based feedback, the client device 106 of the human grader can have a review platform, which is a specific user interface for grading purposes. The local application 128 and/or the web extension 131 can provide the human grader access to the review platform. In various embodiments, the review platform provides human graders with navigation tools that allows them to review new test submissions from users taking similar subjects once the previous test submission is reviewed. For example, when the computing environment 103 identifies identical tests waiting in the review queue from different users, the human grader will automatically be taken to those submissions. In another example, if there are no identical test waiting in the review queue, it will look for lessons that share a category or learning path.

The review platform of the client device 106 can include a full submission log with a user's previous attempts at a lesson along with previous comments from other human graders. In at least one embodiment, providing the current human grader with information regarding the user's progress history allows the human grader to make a contextual and accurate assessment of any current or future submissions by the same user.

The computing environment 103 can conduct automated grading of a user's test submission. Automated grading can include exact match grading, partial match grading, and/or any other form of automated grading format. The computing environment 103 can determine the automated grading format based on the test data 172. In various embodiments, when a user submits a test solution, the computing environment 103 matches the test submitted to the test data 172. The computing environment 103 can extract the test type from the test data 172. In particular embodiments, the computing environment 103 can determine the automated grading format based on the extracted test type from the test data 172.

In some embodiments, the computing environment 103 selects the exact match grading format for a user's test submission. In at least one embodiment, an exact match grading format requires all material from the user's test submission to exactly match the test solutions stored in the test data 172. In one example, when a user submits a text file for grading, the computing environment 103 can assess the type of automated grading format the test submission requires. Continuing this example, the computing environment 103 can select the grading format by assessing the test data 172 of the particular test corresponding to the text file submitted by the user. Continuing this example, the computing environment 103 can select an exact match grading format for the text file submitted by the user. Continuing this example, the computing environment 103 can give a passing grade to the user if every word in the submitted text file matches the test solution corresponding to their submission. Continuing this example, the computing environment 103 can give a failing grade to a user if at least one word in their submitted text file is distinct from the test solution corresponding to their submission.

In some embodiments, the computing environment 103 selects the partial match grading format for a user's test submission. In one or more embodiments, the partial match grading format requires a submission to include all instances of particular words and/or phrases that are present in a test solution. In alternative embodiments, the partial match grading format requires a submission to include at least one instance of particular words and/or phrases that are present in a test solution.

In at least one example, when a user submits a text file for grading, the computing environment 103 selects a partial match grading format to review the response from the user. Continuing this example, a computing environment 103 can select a partial match grading format requiring the text file to include all instances of particular words and/or phrases present in the test solution. Continuing this example, the computing environment 103 can give a user a passing grade if the text file submitted by the user includes all the words and/or phrases present in the test solution. Continuing this example, the computing environment 103 can give a user a failing grade if the text file submitted by the user does not include all words and/or phrases present in the test solution.

In another example, when a user submits a text file for grading, the computing environment 103 selects a partial match grading format to review the response from the user. Continuing this example, a computing environment 103 can select a partial match grading format requiring the text file to include at least one instances of particular words and/or phrases present in the test solution. Continuing this example, the computing environment 103 can give a user a passing grade if the text file submitted by the user includes at least one word and/or phrase present in the test solution. Continuing this example, the computing environment 103 can give a user a failing grade if the text file submitted by the user does not include at least one word and/or phrase present in the test solution.

In various embodiments, the computing environment 103 can return the results of the automated grading system to the user. In one example, if the computing environment 103 returns a failing result to the user, the computing environment 103 can give the user at least one more attempt to resubmit their corrected test submission. Continuing this example, when the user resubmits the corrected test submission, the computing environment 103 can send the test submission to a human grader for grading. In an alternative continuation of the initial example specified herein, the computing environment 103 can conduct automated grading on the user's test resubmission. The computing environment 103 can employ machine learning and/or natural language processing systems for its automated grading techniques.

The local application 128 and/or a web extension 131 can provide the user with quizzes to test their proficiency in a subject. The quiz creator, which can be a user of the disclosed system and/or the disclosed system's creator, can determine various attributes given to a particular quiz. The particular attributes given to a quiz can include, quiz questions, quiz solutions, pass rate as a percentage, pass rate as a numerical score, choosing to show missed questions, choosing to show correct answers, question paragraphs, solution text boxes, questions and their corresponding answers, and/or any other quiz attributes. When a user completes a quiz, the computing environment 103 can use any form of grading format to determine the correctness of the user's answers. The computing environment 103 can produce a passing rate for the user and take appropriate actions accordingly.

The computing environment 103 can automatically grade a user's submission based on their submitted URL. The computing environment 103 can check if a user has submitted a viable URL link. The computing environment 103 can translate the URL submitted by a user into a HyperText Markup Language (HTML) script. The computing environment 103 can extract the test solutions from the test data 172. The test solutions can include information regarding the type of code snippets necessary to incorporate in the HTML script for a passing grade. The computing environment 103 can compare the test solutions to the user's translated URL submission. In particular embodiments, if the computing environment 103 determines that all necessary code snippets are included in the user's translated URL submission, the user with receive a passing grade. In an alternative embodiment, if the computing environment 103 determines that at least one of the necessary code snippets is missing from the user's translated URL submission or incorrect, the user with receive a failing grade. If a user receives a failing grade, the computing environment 103 can allow the user to resubmit at least one corrected URL for grading. The computing environment 103 can determine the appropriate grading format (e.g., automated, human assisted) based on the user's URL resubmission.

The local application 128 and/or the web extension 131 can include an integrated screen recording and/or a screen image capturing option. In particular embodiments, if the user wants to take a screen recording and/or an image capture of the client device 106, the user can select the integrated screen grabbing option within the local application 128 and/or the web extension 131. The screen recording or image capture can be localize to any area of the user's client device 106 determined by the user. In some embodiments, when a user completes their screen recording or image capture, the local application 128 and/or the web extension 131 can send the file to the computing environment 103 for further processing.

The local application 128 and/or the web extension 131 can host a scheduling platform for managing scheduled lessons and events for a particular registered user. In some embodiments, the functionality described by as being performed by the local application 128 and/or the web extension 131 can also be performed by a web browser 134 or a web application. In various embodiments, a web application can be any application or tool accessible through the web browser 134. The local application 128 and/or the web extension 131 can request the computing environment 103 to extract community data 169 that provides a proposed schedule for a user selected learning path. The computing environment 103 can send the schedule data extracted from the community data 169 to one or more individual client device 106. The user can use the local application 128 and/or the web extension 131 to distribute a schedule across a plurality of client devices 106. In one example, a user can be a school district that has a plurality of client devices 106. Continuing this example, the user can distribute a schedule of in person or virtual instruction for a particular learning path or component of the particular learning path across one or more client devices 106. Continuing this example, the computing environment 103 can send a notification to the client devices 106 notifying them of particular deadlines. The user can request the local application 128 and/or the web extension 131 to schedule the lessons for particular times and dates throughout the week. The user can request the local application 128 and/or the web extension 131 to schedule the lessons as either synchronous, partially synchronous, and/or fully asynchronous for an individual or plurality of client devices 106. The user can request the local application 128 and/or the web extension 131 to change lesson dates to better suit the pace of the user.

The local application 128 and/or the web extension 131 can provide the user with the estimated time per day, week, month, and/or year a user has to devote to a particular learning path to complete it on time. The local application 128 and/or the web extension 131 can provide a pace value that informs the user if they are on track to finish their deadline goals. For example, if a user is behind on their goals, the local application 128 and/or the web extension 131 can generate a message or prompt to indicate the user is falling behild (e.g., a "falling behind" notification). Continuing this example, if a user is on pace to reach their goals, the local application 128 and/or the web extension 131 can prompt an "on pace" notification. If a user is ahead of their predetermined pace, the local application 128 and/or the web extension 131 can prompt a "you're ahead by X days/months/years/etc." notification.

The local application 128 and/or the web extension 131 can augment the pace notifications with a progress bar. In some embodiments, a progress bar is defined as a metric used to visually indicate to the user how likely they are to complete or miss their deadline. The local application 128 and/or the web extension 131 can display the progress bar in a variety of instances. For example, if there's more than 30 days left in goal, the progress bar can show the pace as minutes or hours per week. Continuing this example, if the current pace of a user is greater than 60 min per week, the local application 128 and/or the web extension 131 can show the progress bar as weeks, hours, or number of courses remaining (round up to nearest value). In another example, if there is less than or equal to 30 days left in goal, the progress bar can show the pace as minutes per day (minimum of 5 minutes per day). Continuing this example, if the current pace is greater than 20 minutes per day, the local application 128 and/or the web extension 131 can show the progress bar as courses per day (round up to nearest course).

The local application 128 and/or the web extension 131 can use the scheduling platform to organize virtual and/or in-person events. In particular embodiments, an organized event can be defined as a group session, a one-on-one lesson, or any other form of live (virtual or in-person) learning activity. For example, the local application 128 and/or the web extension 131 of the at least two or more client devices 106 can connect and display a conference interface to facilitate communication between a plurality of users. In various embodiments, the user can sign up for particular events through the local application 128 and/or the web extension 131. In some embodiments, the user does not need to be part of an active learning path schedule to sign up for events through the local application 128 and/or the web extension 131. The local application 128 and/or the web extension 131 can create calendar reminders for specific events for the user through the scheduling platform. The local application 128 and/or the web extension 131 can live stream synchronous virtual events. The local application 128 and/or the web extension 131 can provide location details for live in-person events.

The local application 128 and/or the web extension 131 can complement asynchronous learning path lessons with synchronous events. The local application 128 and/or the web extension 131 can recommend live events to a user depending on their active learning paths. In one example, the user takes a learning path that teaches the fundamentals for using Google Drive, and the computing environment 103 can compare active synchronous events (local or virtual) to the Google Drive learning path of the particular user. Continuing this example, the computing environment 103 finds a local in-person seminar teaching how to use Google Drive and sends this event to the scheduling platform of the local application 128 and/or the web extension 131 of the particular user. The particular user can accept or decline the event.

The local application 128 and/or the web extension 131 can present users with a rating platform for synchronous or asynchronous lessons and events. The local application 128 and/or the web extension 131 can ask users to rate a particular lesson or event after completion. The local application 128 and/or the web extension 131 can prompt users with a list of different lessons or events if the user particular liked or disliked a specific lesson or event. In one embodiment, the management service 113 can analyze rating histories of various users to identify patterns of types of individuals (e.g., using machine learning). The management service 113 can assign users into one or more statistical bins/sets based on the identified patterns. As an example, the management service 113 may identify a first set of users that rate in person events with food service or particular types of food service a threshold amount higher (e.g., one standard deviation, two standard deviations, or some other configurable threshold) than an average user rating. The management service 113 may identify a second set of users that rate in person events with durations less than an hour higher than an average user rating and events with durations longer than or equal to an hour lower (e.g., one standard deviation, two standard deviations, or some other configurable threshold) than an average user rating. In some embodiments, the first set and the second set may have overlapping users. In other embodiments, the first set and the second set may be mutually exclusive (e.g., the management service 113 can assign a particular user to only one of the first set or the second set based, for example, on which has a higher coefficient of correlation). The management service 113 can identify and recommend specific courses to a user assigned to a particular set (e.g., the first set, the second set, etc.) that 1) the user has not yet attended, and 2) the courses are rated above a threshold by other users in the particular set.

Other attributes the scheduling platform of the local application 128 and/or the web extension 131 can include are reward systems for attending synchronous events, replacement asynchronous lessons to accommodate for missed synchronous events, require the completion of prerequisite courses before attending a particular synchronous event, require a completed evaluation before particular events, restrict synchronous events to particular organizations or groups of people, ranking events based on difficulty, hours or amount of credit earned by attending particular synchronous events, presence tracking and notifications, requiring the presence of a particular synchronous event to complete a learning path, and any other form of interactive tool used to manage the schedule of a particular user. The management service 113 can assign badges to users that successfully complete an event/course or series of events/course. In some embodiments, the management service 113 can assign or award the badge when a particular predefined set of events/courses are completed.

The local application 128 and/or the web extension 131 can include a user interface for community services. The community services can be defined as a platform where a plurality of users can share and interact with user created learning environments. In particular embodiments, the community services include, but are not limited to, a ranking system for user created learning environments, a forum section to discuss user created learning environments, an improvements page for users to submit bug reports or feedback for the disclosed system, copying abilities of user generated learning environments, and an editor for new or published user generated learning environments.

The community services of the local application 128 and/or the web extension 131 can include a ranking system for user-generated lessons. The computing environment 103 can rank the user-generated lesson based on popularity (e.g., how many people have copied the course, how many people have completed the lessons, how many up-votes a user generated lesson has). The local application 128 and/or the web extension 131 can display the ranking of user-generated lessons and can allow users to filter user generated lessons by categories. For example, categories can include, but are not limited to, math lessons, computer science lessons, natural sciences lessons, and linguistics lessons.

The computing environment 103 can create a personalized yearly recap video highlighting the training moments of a particular user throughout the year. The computing environment 103 can send the generated video to the client device 106 of the particular user and display it to the user.

Figure 2:
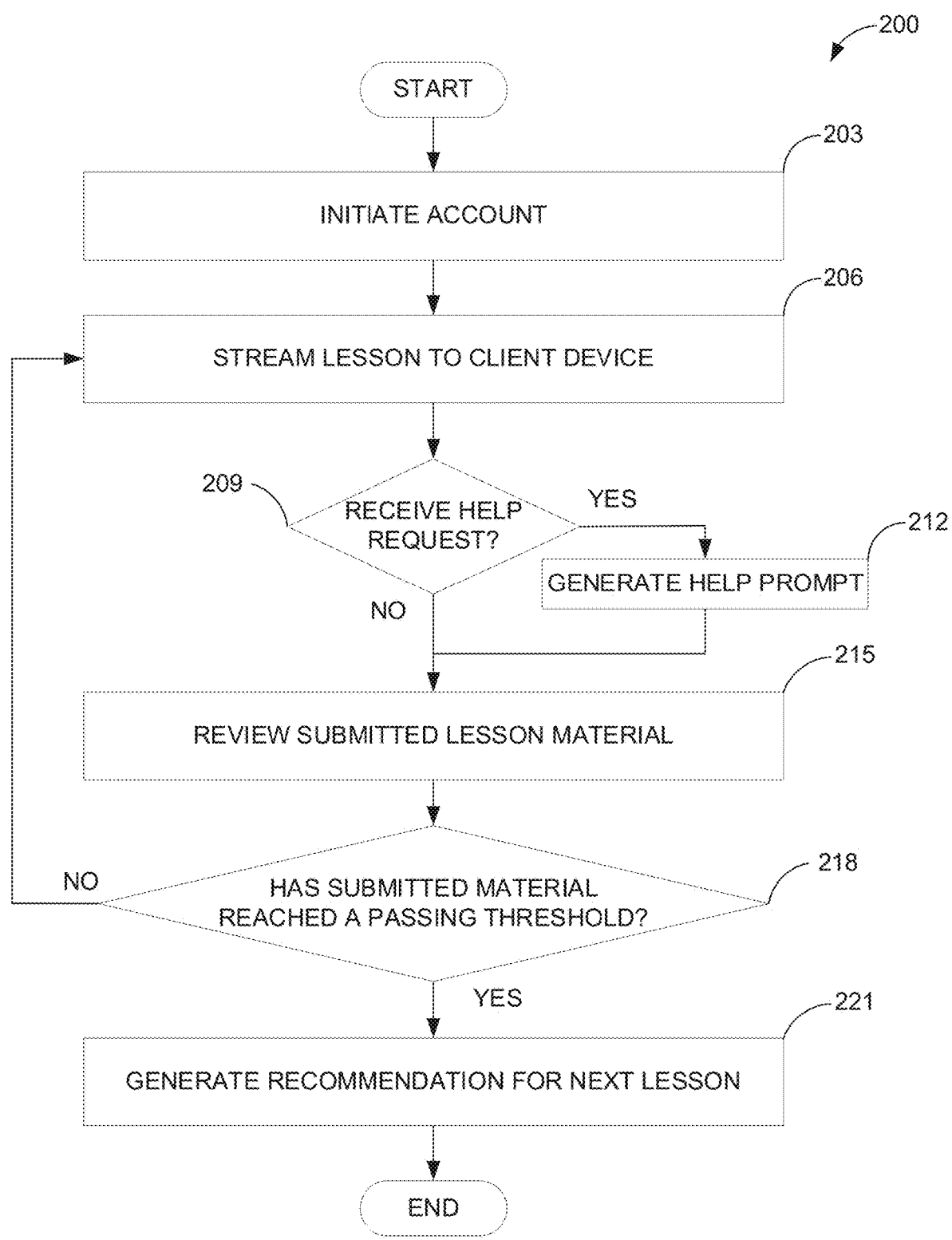
FIG. 2 illustrates a flowchart of a process, according to one embodiment of the present disclosure.

Referring now to FIG. 2, shown is a flowchart of the process 200 according to various embodiments of the present disclosure. The process 200 can relate to one of the functionalities of the disclosed system. In some embodiments, the process 200 can initiate with the creation of an account. In other embodiments, the process 200 can include generating lesson recommendations after a user completes a lesson. The computing environment 103 can communicate with the client device 106 over the network 109 to facilitate the process 200. In various embodiments, the client device 106 can include one or more prerequisite software or hardware components installed on the client device 106 (e.g., local application 128, browser extension 131, target lesson requirements). For example, a client device 106 can include access to Google Drive to complete a lesson for Google Drive.

At step 203, the process 200 can include initiating an account. The client device 106 can prompt the user to create an account or authenticate an existing account after downloading the necessary software (e.g., local application 128) and/or web extension 131. The web browser 134 can provide the user with an account creation portal through the web browser 134. For example, a user can create an account by accessing a website of the company, authenticating an existing identity, using a federated identity, or another identity. In an alternative example, the user can create an account using a dedicated web extension store (e.g., GOOGLE CHOME Web Store, FIREFOX Browser Add-Ons, etc.). In particular embodiments, a client device 106 can request a user to input account information manually, or have a third party account pre-populate the required account information. The account information can include, but is not limited to, name, age, technical proficiency information, school district, email, password, profession, and user goals. Some examples of third party accounts that pre-populate the required account information can include, but are not limited to, Facebook, Google accounts, and Microsoft accounts.

The computing environment 103 can create necessary data stores for a particular account once created. For example, once a user has created an account and the client device 106 has sent the corresponding data to the computing environment 103, the computing environment 103 can populate the user account data 163 into the respective data entities of the data store 116. Continuing this example, the computing environment 103 can create necessary data entities, such as community data 169, test data 172, and grading data 175, and link these data entities to the particular user account data 163. In some embodiments, the data entities created after account initiation can be empty data sets. In later steps of the process 200, which will be described in detail herein, the computing environment 103 can populate the remaining data entities of the data store 116 accordingly. In at least one embodiment, the client data 125 can include local versions of the account information, and/or any other pertinent information, created during account initiation.

At step 206, the process 200 can include streaming a lesson to the client device 106. In some embodiments, the computing environment 103 can generate a recommendation of lessons based on the user's inputted account data. A lesson can refer to an individual lesson, a lesson from a particular learning path, an entire learning path, and/or any other form of lesson. The user can select a lesson to begin. Selecting the lesson can prompt the client device 106 to send information to the computing environment 103 regarding the selected lesson. Once received, the computing environment 103 can stream the selected lesson plan to the client device 106. In some embodiments, the streaming can include sending data to the client device 106 that can be used to render a presentation on one or more output devices (e.g., displays, speakers, etc.). Streaming can include, but is not limited to, loading the client device 106 with a local version of the lesson and running the lesson from the client device 106, real-time streaming, and/or batch processing techniques. In particular embodiments, the client device 106 can prompt the user to select a preferred streaming method. For example, if the user is expecting to have minimal internet access, the client device 106 can be pre-loaded with lessons, reducing the reliance on internet connectivity. Once the computing environment 103 streams the lesson information to the client device 106, the user can commences the lesson.

At step 209, the process 200 can include determining whether the computing environment 103 has received a help request. The client device 106 can send a help request to the computing environment 103 depending on one or more particular factors. Help request factors can include, but are not limited to, receiving a direct request from a user account, determining a timeout of a predefined threshold for a section of the lesson, and/or receiving repeated incorrect answers on submitted exams. For example, the web extension 131 and/or local application 128 can include a user interface that facilitates requesting for help. Continuing with this example, the user interface of the client device 106 can include a text box or a "Help" button to request for help. When requests for help is received by the client device 106 (e.g., via an input device), the client device 106 can send the help request to the computing environment 103. When the request for help is received, the process 200 can proceed from step 209 to step 212.

At step 212, after the computing environment 103 receives a help request from the client device 106, the computing environment 103 can send a help response to the client device 106. A help response can include, but is not limited to, a video walkthrough, a text response, and/or a script that shows the required next steps to the user. For example, if a user requests video help, the computing environment 103 can stream a pre-recorded video explaining the steps of the lesson. Once the client device 106 has rendered help on one or more output devices and the lesson materials is completed, the client device 106 can submit and send lesson material to the computing environment 103. The computing environment 103 can automatically send the help response to a client device 106 without receiving a particular request from the user. As an example, the client device 106 can generate a user interface that includes the help automatically or at the direction of the computing environment.

In the case a request for help is not received and a predefined timeout corresponding to the section of the lesson has not been met, the client device 106 can submit the lesson materials to the computing environment 103. For example, if the user progresses through the lesson at the average pace of other users, the client device 106 can determine the predefined timeout has not been exceeded and not request for help, and the user can complete and submit the lesson materials accordingly.

At step 215, the process 200 includes revising submitted lesson materials. Once the computing environment 103 receives the lesson material from the client device 106, the computing environment 103 can determine a grade for the particular submission. The submission grading can include one or more of the techniques described in herein among others. For example, the computing environment 103 can grade a submission using machine learning and natural language processing techniques. In an alternative example, the computing environment 103 can grade the submitted material using one or more automated grading techniques. In some embodiments, the local application 128, the browser extension 131, and/or the web browser 134 can include an evaluation mode. In some embodiments, the evaluation mode can facilitate providing feedback overlaid on the target application 137 and/or the web browser 134. For example, the web extension 131 can overlay feedback for an incorrect font type in Google Slides by providing feedback text over the location where the error occurred. Once the submission is graded, the computing environment 103 can assess whether the submission passes a required score for the lesson.

At step 218, the process 200 can include evaluating if the submission has met the requirements for passing a lesson. In particular embodiments, once the computing environment 103 grades the submitted lesson material, the computing environment 103 compares the requirements for passing the results of the submission. In the case that the submission passes, the process 200 can proceed to step 221. For example, if the user's submission receives a score of 92% where a required threshold is set to 90%, the process 200 can proceed to step 221.

In an alternative example, where the submission receives a score of 82%, the computing environment 103 will send a prompt to the user through the client device 106 to restart the lesson or generate a tutorial to provide instruction. The instruction can be customized based on the portions of the submissions identified as incorrect. For example, the tutorial can include instruction detailing underlying concepts required to correctly complete the incorrect portions of the submission. In this example, the computing environment 103 can provide additional help prompts specifically towards the area where the user committed mistakes in their submission. For example, if the user uploaded the wrong type of file in their original submission (e.g., a Word document rather than a PDF), the computing environment 103 can send a help response through the client device 106 during this particular step to teach the user how to select the correct file type. Once the user has corrected their mistakes, the process 200 can proceed from step 218 to step 221.

At step 221, the process 200 can include generating recommendations for next lessons. Recommendations can include, but are not limited to, next lessons in a learning path, similar lessons to previous lessons taken by the user, lessons created by other community members, and/or lessons that relate to the same software of previous lessons taken by the user. The computing environment 103 can generate recommendations using statistical analysis of other users taking the same lessons, and/or machine learning techniques. For example, if a user account has completed lessons on Microsoft Word and historically other user accounts with completed lessons on Microsoft Word also take lessons on Microsoft PowerPoint, the computing environment 103 can generate a recommend for a lesson on Microsoft PowerPoint. In an alternative example, the computing environment 103 can analyze the performance of the user using machine learning techniques and recommend a lesson based on the user's performance.

Figure 3:
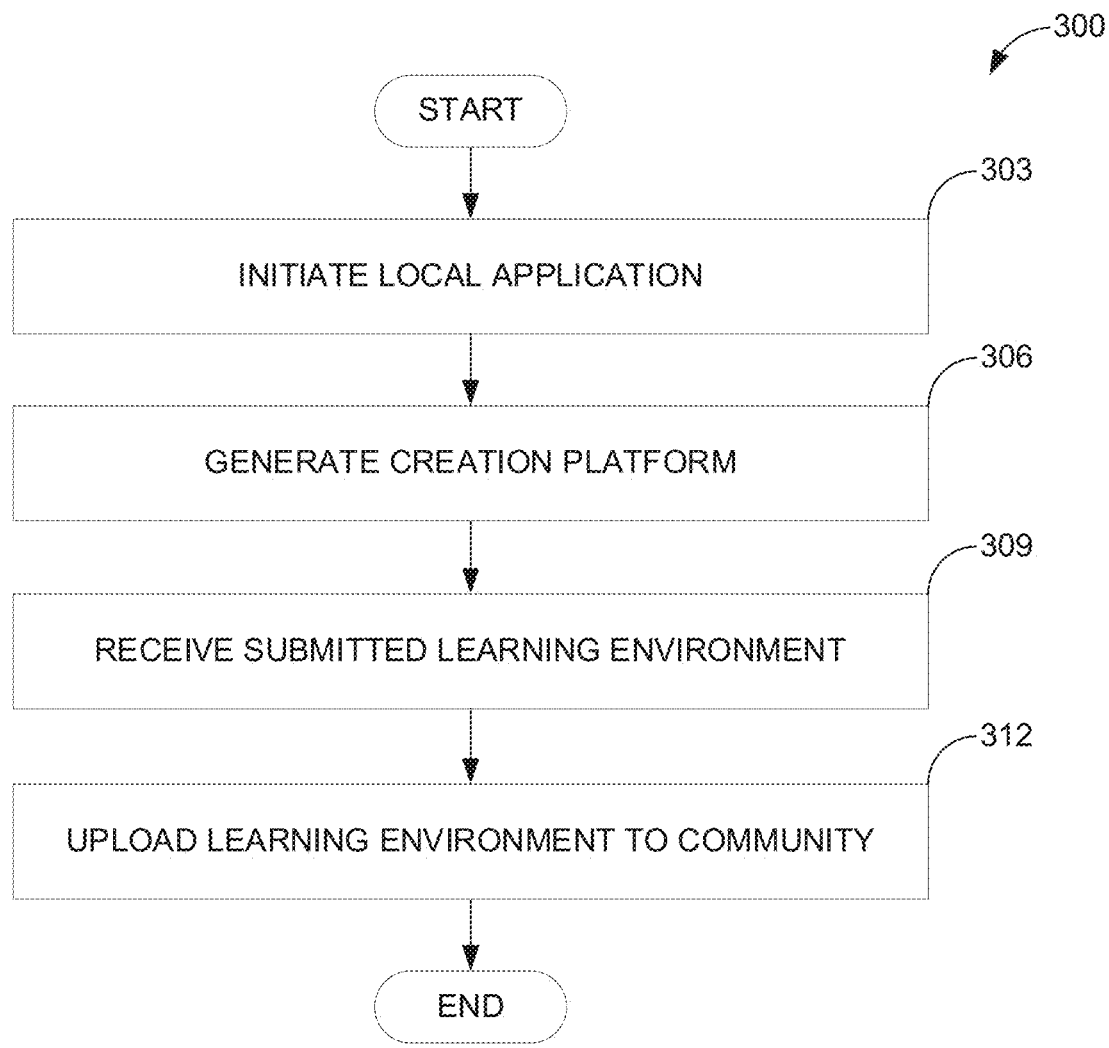
FIG. 3 illustrates a flowchart of a process, according to one embodiment of the present disclosure.

With reference to FIG. 3, shown is a flowchart of the process 300, according to one embodiment of the present disclosure. The process 300 can relate to the creation and distribution of new learning environments. In particular embodiments, the local application 128 and/or the browser extension 131 of the client device 106 can generate a user interface for creating and managing user created learning environments. The client device 106 can process newly created learning environment data received from the local application 128 and/or the browser extension 131. The client device 106 can send the newly created learning environment data to the computing environment 103 for particular processing.

At step 303, the process 300 can include initiating the local application 128. In particular embodiments, the local application 128 and the browser extension 131 can perform the same actions. The client device 106 can initiate a local application 128. The client device 106 can facilitate a communication between the local application 128 and the computing environment 103 during the learning environment creation process.

At step 306, the process 300 can include generating a creation platform. The local application 128 can generate a creating platform for editing and creating learning environments. The creation platform can be a user interface rendered by the local application 128 of the client device 106. The creation platform of the local application 128 can enable lesson creation, homework/assignment creation, help request creation, and can assist in any other learning environment creation process.

At step 309, the process 300 can include receiving the submitted learning environment. In various embodiments, the computing environment 103 receives a submitted learning environment from the client device 106. A submitted learning environment can include either a new learning environment or an edited learning environment. The computing environment 103 can process the data of the submitted learning environment and store the information accordingly.

At step 312, the process 300 can include uploading the learning environment to the community. The computing environment 103 can store the newly created or edited learning environment in the community data 169. The computing environment 103 can publish the newly created or edited learning environment to the community platform to share amongst a plurality of users. The client device 106 can render a community browsing page that promotes the distribution of user created learning environments. The client device 106 and/or the computing environment 103 can gather data regarding the popularity and/or feedback of particular user created learning environments.

Figure 4:
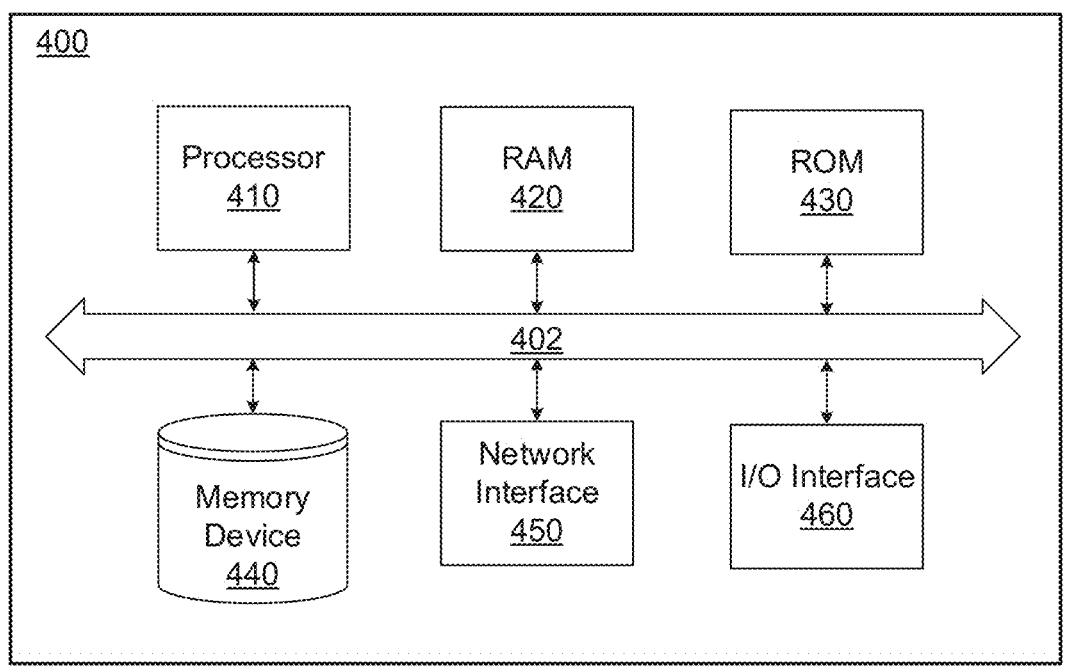
FIG. 4 illustrates a computing device, according to one embodiment of the present disclosure.

With reference to FIG. 4, shown is a schematic block diagram of the computing environment 103 according to an embodiment of the present disclosure. The computing environment 103 includes one or more computing devices 400. Each computing device 400 includes at least one processor circuit, for example, having a processor 410 and a memory 440, both of which are coupled to a local interface 402. To this end, each computing device 106 may include, for example, at least one server computer or like device. The local interface 402 may include, for example, a data bus with an accompanying address/control bus or other bus structure as can be appreciated.

Stored in the memory 440 are both data and several components that are executable by the processor 410. In particular, stored in the memory 440 and executable by the processor 410 are the management service 113, the local application 128, the browser extension 131, the web browser 134, the target applications 137, and potentially other applications. Also stored in the memory 440 may be a data store 116 and other data. In addition, an operating system may be stored in the memory 440 and executable by the processor 410.

It is understood that there may be other applications that are stored in the memory 440 and are executable by the processor 410 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 440 and are executable by the processor 410. In this respect, the term "executable" means a program file that is in a form that can ultimately be run by the processor 410. Examples of executable programs may be, for example, a compiled program that can be translated into machine code in a format that can be loaded into a random access portion of the memory 440 and run by the processor 410, source code that may be expressed in a proper format such as object code that is capable of being loaded into a random access portion of the memory 440 and executed by the processor 410, or source code that may be interpreted by another executable program to generate instructions in a random access portion of the memory 440 to be executed by the processor 410, etc. An executable program may be stored in any portion or component of the memory 440 including, for example, random access memory (RAM) 420, read-only memory (ROM) 430, hard drive, solid-state drive, USB flash drive, memory card, optical disc such as compact disc (CD) or digital versatile disc (DVD), floppy disk, magnetic tape, or other memory components.

The memory 440 is defined herein as including both volatile and nonvolatile memory and data storage components. Volatile components are those that do not retain data values upon loss of power. Nonvolatile components are those that retain data upon a loss of power. Thus, the memory 440 may include, for example, random access memory (RAM) 420, read-only memory (ROM) 430, hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM 420 may include, for example, static random access memory (SRAM), dynamic random access memory (DRAM), or magnetic random access memory (MRAM) and other such devices. The ROM 430 may include, for example, a programmable read-only memory (PROM), an erasable programmable read-only memory (EPROM), an electrically erasable programmable read-only memory (EEPROM), or other like memory device.

Also, the processor 410 may represent multiple processors 410 and/or multiple processor cores and the memory 440 may represent multiple memories 440 that operate in parallel processing circuits, respectively. In such a case, the local interface 402 network interface 450, and/or I/O interface 460 may be an appropriate network that facilitates communication between any two of the multiple processors 410, between any processor 410 and any of the memories 440, or between any two of the memories 440, etc. The local interface 402 may include additional systems designed to coordinate this communication, including, for example, performing load balancing. The processor 410 may be of electrical or of some other available construction.

Although the management service 113, the local application 128, the browser extension 131, the web browser 134, the target applications 137, and other various systems described herein may be embodied in software or code executed by hardware as discussed above, as an alternative the same may also be embodied in dedicated hardware or a combination of software/hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application-specific integrated circuits (ASICs) having appropriate logic gates, field-programmable gate arrays (FPGAs), or other components, etc.

The flowcharts of FIGS. 2, 3, 5, 6, and 7 show the functionality and operation of an implementation of portions of the management service 113, the local application 128, the browser extension 131, the web browser 134, and/or the target applications 137. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 410 in a computer system or other system. The machine code may be converted from the source code, etc. If embodied in hardware, each block may represent a circuit or a number of interconnected circuits to implement the specified logical function(s).

Although the flowcharts of FIGS. 2, 3, 5, 6, and 7 show a specific order of execution, it is understood that the order of execution may differ from that which is depicted. For example, the order of execution of two or more blocks may be scrambled relative to the order shown. Also, two or more blocks shown in succession in FIGS. 2, 3, 5, 6, and 7 may be executed concurrently or with partial concurrence. Further, in some embodiments, one or more of the blocks shown in FIGS. 2, 3, 5, 6, and 7 may be skipped or omitted. In addition, any number of counters, state variables, warning semaphores, or messages might be added to the logical flow described herein, for purposes of enhanced utility, counting, performance measurement, or providing troubleshooting aids, etc. It is understood that all such variations are within the scope of the present disclosure.

Also, any logic or application described herein, including the management service 113, the local application 128, the browser extension 131, the web browser 134, and the target applications 137, that include software or code can be embodied in any non-transitory computer-readable medium for use by or in connection with an instruction execution system such as, for example, a processor 410 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the management service 113, the local application 128, the browser extension 131, the web browser 134, and the target applications 137, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 106 or in multiple computing devices in the same computing environment 103 or client device 106. Additionally, it is understood that terms such as "application," "service," "system," "engine," "module," and so on may be interchangeable and are not intended to be limiting. For example, while specific functionality may be described as happening by a specific application (e.g., the management service 113, the local application 128, the browser extension 131, the web browser 134, and the target applications 137), it us understood that the functionality described may be interchangeable and is not intended to be limiting to a specific component.

Figure 5:
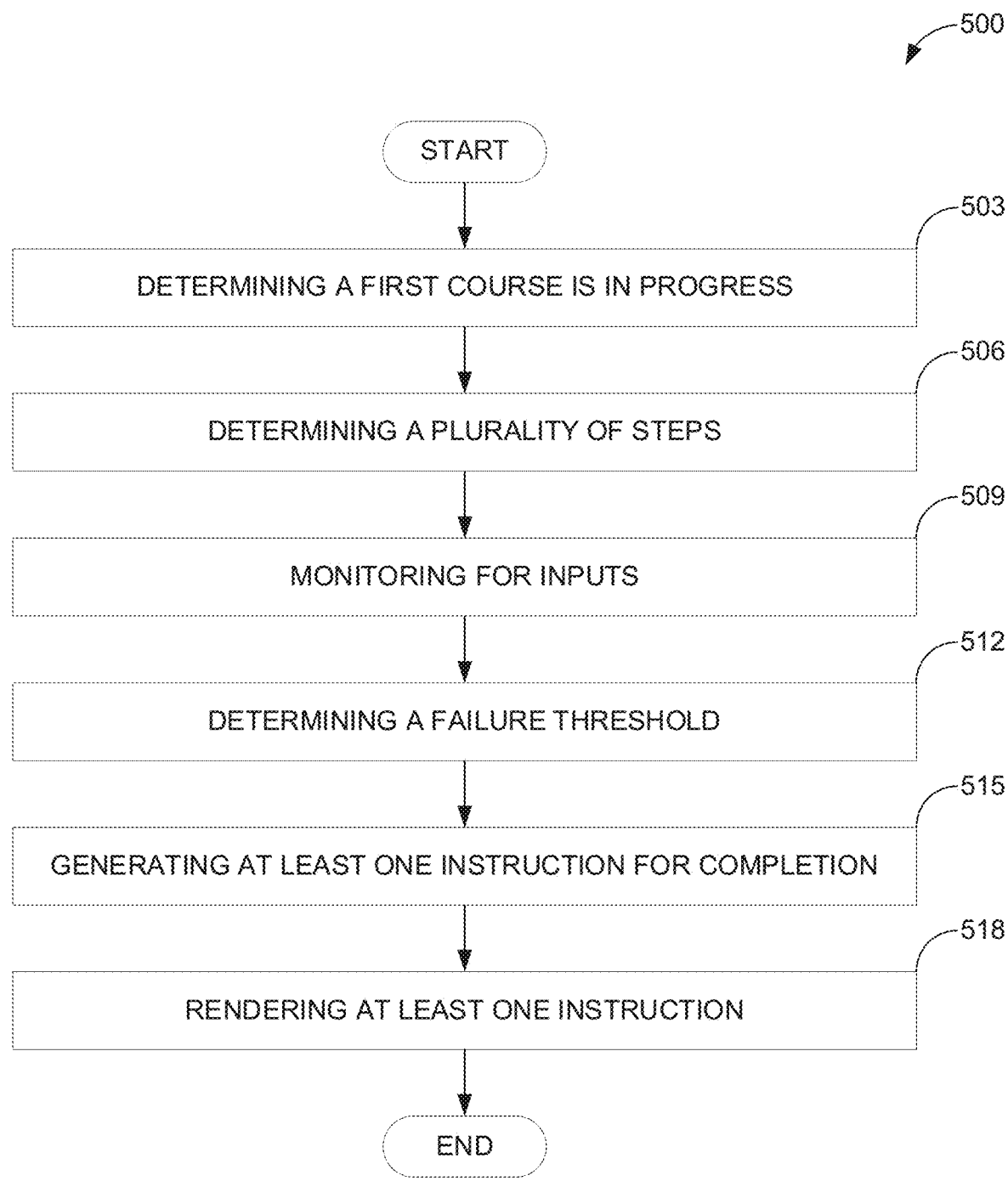
FIG. 5 illustrates a flowchart of a process, according to one embodiment of the present disclosure.

Referring now to FIG. 5, illustrated is a flowchart of the process 500, according to one embodiment of the present disclosure. In various embodiment, the process 500 demonstrates how the client device 106 and/or the computing environment 103 manages an active lesson. The process 500 can be an augmentation of boxes 206, 209, and 212 of the process 200. In at least one embodiment, the process 500 can be performed in any particular order and with any degree of frequency. For example, box 512 can occur more than one time at any particular interval during the process 500.

At box 503, the process 500 can include determining that a tutorial of a particular course is in progress on the at least one computing device 106. The client device 106 can initiate the tutorial related to a target application 137 and/or a web browser 134. For example, the computing device 106 can monitor activity through internal logs to identify if the target application 137 and/or the web browser 134 has been launched. Continuing this example, the client device 106 can surface the browser extension 131 on recognition of the associated target application 137 and/or the web browser 134. In some embodiments, the client device 106 can identify user account data 163 associated with the client device 106. In some embodiments, the web browser 131 determines that the tutorial of the course is in progress based on the associated user account data 161 of the client device 106. The client device 106 can communicate with the data store 116 to extract training data 166 associated with the particular target application 137 and/or web browser 134. The client device 106 can parse through the extracted training data 166 to identify an associated course with the target application 137 and/or the web browser 134. The client device 106 can display the associated course of the target application 137 and/or the web browser 134 as a recommended course through the extension browser 131 if the associated user account data 163 has not completed the particular course. In some embodiments, the client device 106 displays a list of courses associated with the target application 137 and/or the web browser 134 and request an initialization of the course. On receiving the request for initializing the particular course, the client device 106 can extract the training data 166 and display the course through the browser extension 131. In various embodiments, the extension browser 131 can monitor activities on the client device 106 to determine if a course is in progress. For example, the extension browser 134 can perform screen scraping to recognize and determine if a course is currently active on the client device 106. In another example, the extension browser 131 can communicate with the web browser 134 to receive API calls related to a particular course. On receiving API calls to initiate a course, the browser extension 131 can communicate with the computing environment 103 to extract training data 166 associated with the particular lesson.

At box 505, the process 500 includes determine a plurality of steps associated with the tutorial of the course, according to one embodiment of the present disclosure. In particular embodiments, the client device 106 analyzes the training data 166 to determine the number of steps required to complete the particular course. For example, the browser extension 131 can parse through the training data to determine the current step of the course. In some embodiments, the client device 106 can determine how many steps have been successfully completed and how many have been unsuccessfully completed. In various embodiments, the client device 106 can aggregate step completion data to determine which steps are the most difficult, which steps are the easiest, which steps require the least amount of time, which steps require the most amount of time, and any other information associated with the steps of the course.

At box 509, the process 500 can include monitoring for at least one input into a plurality of input fields associated with the tutorial of the course, according to one embodiment of the present disclosure. In certain embodiments, the web extension 131 can monitor activity associated with the target application 137 and/or the web browser 134. For example, the web browser 134 can monitor text inputs into a text box. In another example, the web browser 134 can monitor number of clicks in a sub field of the target application 137 and/or the web browser 134. In certain embodiment, the web extension 131 use screen capture and/or screen scraping technologies to record actions conducted on the target application and/or web browser 134. In at least one embodiment, the web extension 131 can monitor transmission control protocol (TCP) communications, and/or any other particular transport layer protocol, to determine content produced by the web browser 134 and/or the target application 137. In some embodiment, the web extension 131 can monitor activity logs of the client device 106 to determine inputs associated with the target application 137 and/or the web extension 134. The web extension 131, for example, can inspect the web page for inputs associated with the course. The web extension 131 can automatically evaluate if the inputs associated with the course are completed correctly. The web extension 131 can extract inputs from a script produced by the web browsers 137 and/or the target application 137. The web extension 131 aggregate the input data and store the information in the app data 158.

At box 512, the process 500 includes determining a failure threshold has been exceeded for at least one step based on at least one input, according to one embodiment of the present disclosure. In various embodiments, the failure threshold can be defined as a degree of incorrectness that once exceeded requires intervention from the web extension 131 during a course. The client device 106 can have at least one or more types of failure thresholds to monitor distinct errors found during the particular course. For example, the failure threshold can include, but is not limited to, number of minutes working through a step, number of incorrect attempts, number of incorrect selections, and number of help requests made. In one example, the web extension 131 can monitor how much time is spent on the same page of the web browser 134 and/or the target application 137. If the time exceeds 10 minutes, for example, the web extension 131 can mark the client device 106 exceeding the failure threshold. In another example, the web extension 131 can monitor the number of incorrect selections made for undoing a typing error. Continuing this example, if the web extension 131 monitors 5 selections of incorrect buttons in the target application 137 and/or the web extension 134, the web extension 131 can record a failure threshold fulfillment. In some embodiments, the web extension 131 can monitor the degree of incorrectness of the attempts made in a particular step. For example the client device 106 can record if the answer is close to correct, incorrect, or very incorrect.

At box 515, the process 500 can include generating at least one instruction for completion of the particular step based on the training data 166 of the course. In various embodiments, once the web extension 131 records a failure threshold being exceeded, the client device 106 can automatically generate a help response based on the training data 166. For example, the training data 166 can indicate the type of button selection that will satisfy the requirements of that step. In another example, the training data 166 can indicate the text required that will satisfy the requirement of that particular step. The client device 106 can generate the instruction based on the degree of incorrectness of the particular course step. For example, the client device 106 can generate a complete response if the inputs recognized by the web extension 131 indicate that the step is almost completed. In another example, if the web extensions 131 indicate that the step is not close to being completed, the client device 106 can produce a partial response to guide the user into the right direction without providing the complete response of the step of the course.

At box 518, the process 500 includes rendering at least one instruction on a display of the client device 106, according to one embodiment of the present disclosure. In some embodiments, the web extension 131 can display the instruction on the display of the client device 106. For example, the web extension 131 can surface an arrow pointing to the correct selection to complete a step. In another example, the web extension 131 can surface a video on the display of the client device 106 explaining the step that must be completed. In another example, the web extension 131 can surface a walkthrough that shows the series of inputs that are required to complete a step by rendering arrows, mouse movement, and/or utilizing any other indicators.

Figure 6:
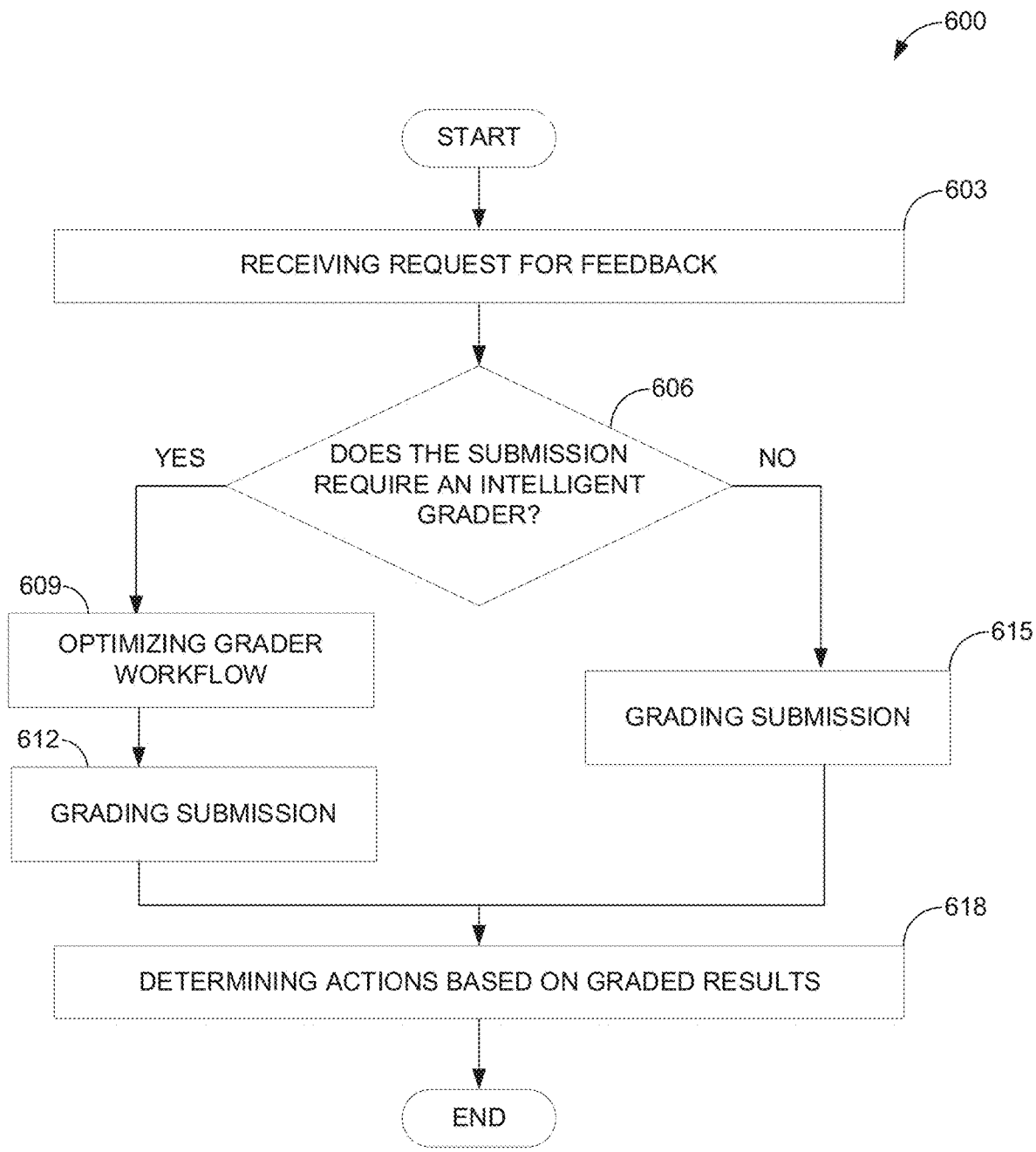
FIG. 6 illustrates a flowchart of a process, according to one embodiment of the present disclosure.

Referring now to FIG. 6, illustrated is a flowchart of the process 600, according to one embodiment of the present disclosure. In some embodiments, the process 600 can demonstrate the methodology for grading a submission made after a course or during a course.

At box 603, the process 600 can include receiving a request for feedback. In various embodiments, the client device 106 and/or the computing environment 103 can receive a feedback request from the web extension 131 after the completion of a course, during the proceedings of a course, and/or before a course begins. In at least one embodiment, the client device 106 can receive the feedback request along with the content used for grading and the course information associated with the response. For example, the content used for grading can include, but is not limited to, text submissions, URLs, videos, screenshots, screen recordings, oral submissions, art, and multiple-choice submissions.

At box 606, the process 600 includes a decision for determining if the feedback submission requires an intelligent grader or not, according to one embodiment of the present disclosure. In some embodiments, an intelligent grader can be defined as a human grader or a computing device that mimics human graders. For example, the client device 106 can include a machine learning algorithm and/or natural language processing system that performs grading of feedback submissions substantially similarly to the human grader. In some embodiments, feedback requests that require intelligent graders include, but are not limited to, video submissions, text submissions, URL submissions, oral submissions, and screenshots. In at least one embodiment, feedback requests that do not-require intelligent graders can include, but are not limited to, multiple choice submissions and mathematical submissions. In certain embodiments, the non-intelligent grading can be performed by the client device 106 by using simple comparisons, statistical analysis, and/or any other computational grading system that does not require extensive computing performance. When the feedback request requires the intelligent grader, the process 600 can proceed to step 609. When the feedback request does not require an intelligent grader, the process 600 can proceed to step 615.

At box 609, the process 600 can include optimizing grader efficiency. In various embodiments, the computing environment 103 can send feedback request and their corresponding submissions to an intelligent grader. In various embodiments, to optimize intelligent grader efficiency, the computing environment 103 can send submissions made by more than one client device 106 within the same subject or field to the same intelligent grader. By sending the same subject matter to the same intelligent grader, the intelligent grader can quickly grade submissions that are similar.

At box 612, the process 600 can include grading a feedback submission. In some embodiments, the computing environment 103 can extract test data 172 associated with the course and response sent by the web extension 131. The computing environment can forward the feedback submission and the test data 172 to the intelligent grader. The computing environment 103 and/or the client device 106 can store a graded feedback request in the grading data 175 of an associated user account data 163 for further processing.

At box 615, the process 600 can include grading a submission. In at least one embodiment, the box 615 can be substantially similar to box 612 but performed by a non-intelligent grader.

At box 618, the process 600 includes determining actions based on the graded results, according to one embodiment of the present disclosure. In particular embodiments, if the grading data 175 of the particular feedback request is too low, the computing environment 103 and/or the client device 106 can associate the grading data 175 to a non-passing grade. The browser extension 131 can request to repeat the course if the associated user account did not pass the particular course. In some embodiments, if the associated user account passed the particular course, the client device can recommend new courses and/or learning paths that are based on the previous passed courses.

Figure 7:
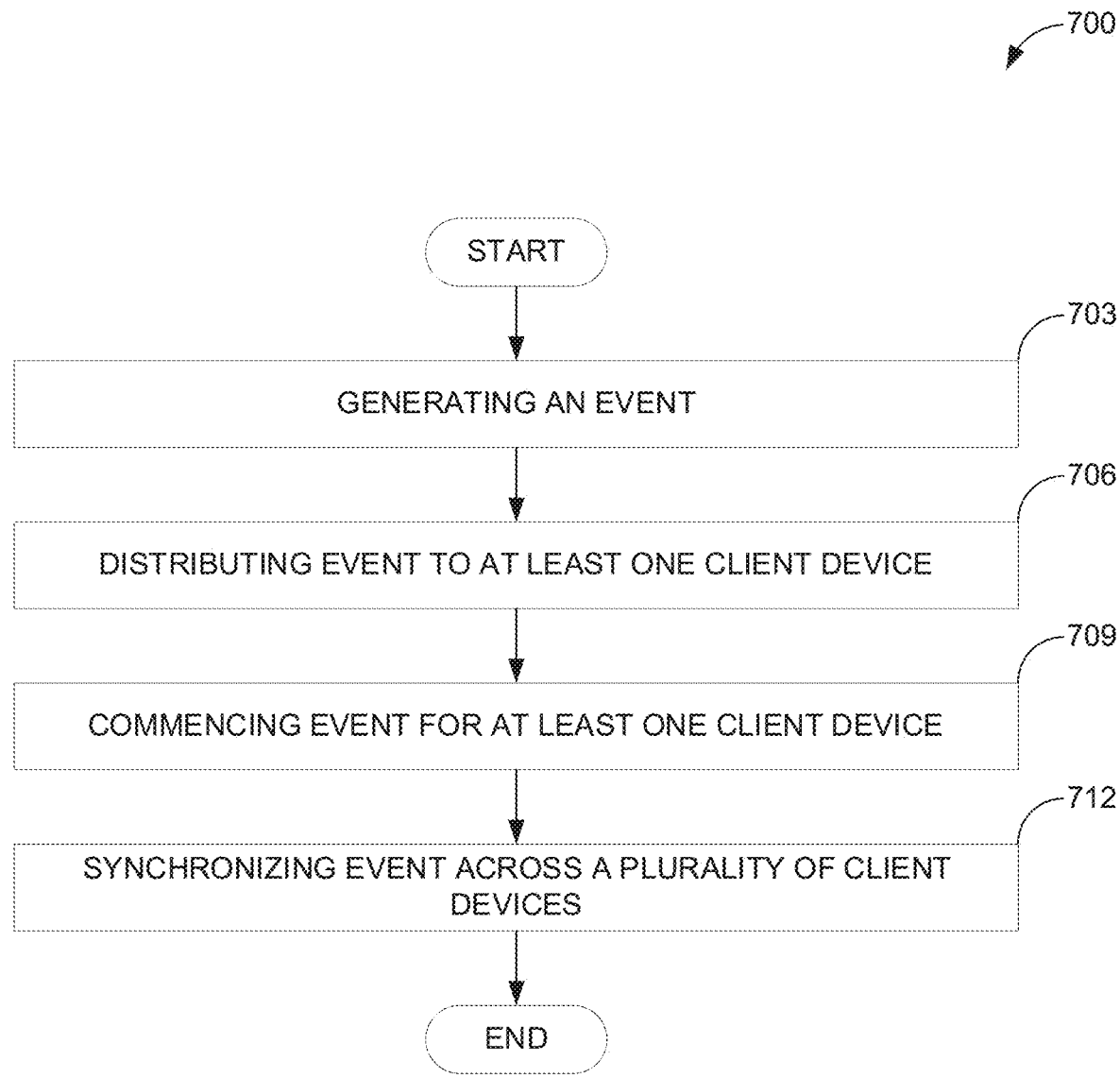
FIG. 7 illustrates a flowchart of a process, according to one embodiment of the present disclosure.

Referring now to FIG. 7, illustrated is a flowchart of the process 700, according to on embodiment of the present disclosure. In certain embodiments, the process 700 can demonstrate the method for generating and managing an event. An event can be substantially similar to a class, tutorial, course, and/or learning path but sent to one or more client devices 106 for completion on a particular date. For example, the computing environment 103 of a school district can require all teachers to perform a Google Drive class on creating zip files in Google Drive. The computing environment 103 can require teachers to complete this course asynchronously before a particular date or synchronously on a particular date and time. In at least one embodiment, the computing environment 103 can send the event to the client device 106 of the teachers in the school district for completion.

At box 703, the process 700 includes generating and event, according to one embodiment of the present disclosure. In at least one embodiment, the client device 106 can surface an event creation page through the local application 128. The client device 106 can receive a request to create an event from the local application. The computing environment 103 can receive the request to create the event and store the event creating request in the data store 116. The event creation request can include, but is not limited to, a time, a date for completion, a location (if applicable), an event name, an event description, a number of credit hours for completing the course, an event type, and the associated course. In various embodiments, the client device 106 can receive a specific custom course for the specific event.

At box 706, the process 700 can include distributing the event to at least one client device. On the creation of the event, the computing environment 103 can sync the client devices 106 associated with the event to display and record the event in a calendar. In some embodiments, the event and any other course or learning path can populate the calendar of at least one client device 106. In some embodiments, the computing environment 103 can require presence of the at least one or more client devices 106 invited to the event.

At box 709, the process 700 can include commencing the event for at least one client device 106. In some embodiments, if the event is synchronous, the computing environment 103 can require associated client devices 106 to commence the event at the same time. If the event is asynchronous, the client devices 106 can complete the event at distinct times.

At box 712, the process 700 can include synchronizing the event across a plurality of client devices associated with one user account. In at least one embodiment, the user account data 163 can include more than one associated client device 106. For example, one user can have a cellphone, a tablet, and a laptop that all interact in the learning environment. In various embodiments, the various client devices 106 associated with the same user account data 163 can synchronize events, classes, learning paths, lessons, and/or tutorials. By synchronizing the events and other activities of the local application 128, the client devices 106 can all include the same progress and information. For example, if a teacher leaves her laptop after completing half of a learning path, the same learning path can be continued on the cellular device of the same teacher. On completion of events and any other course, the computing environment 103 can record presence and share the presence across various client device 106 associated with the user account data 163 and/or other client devices within the same company, school district, university, and/or any particular group.

Figure 8:
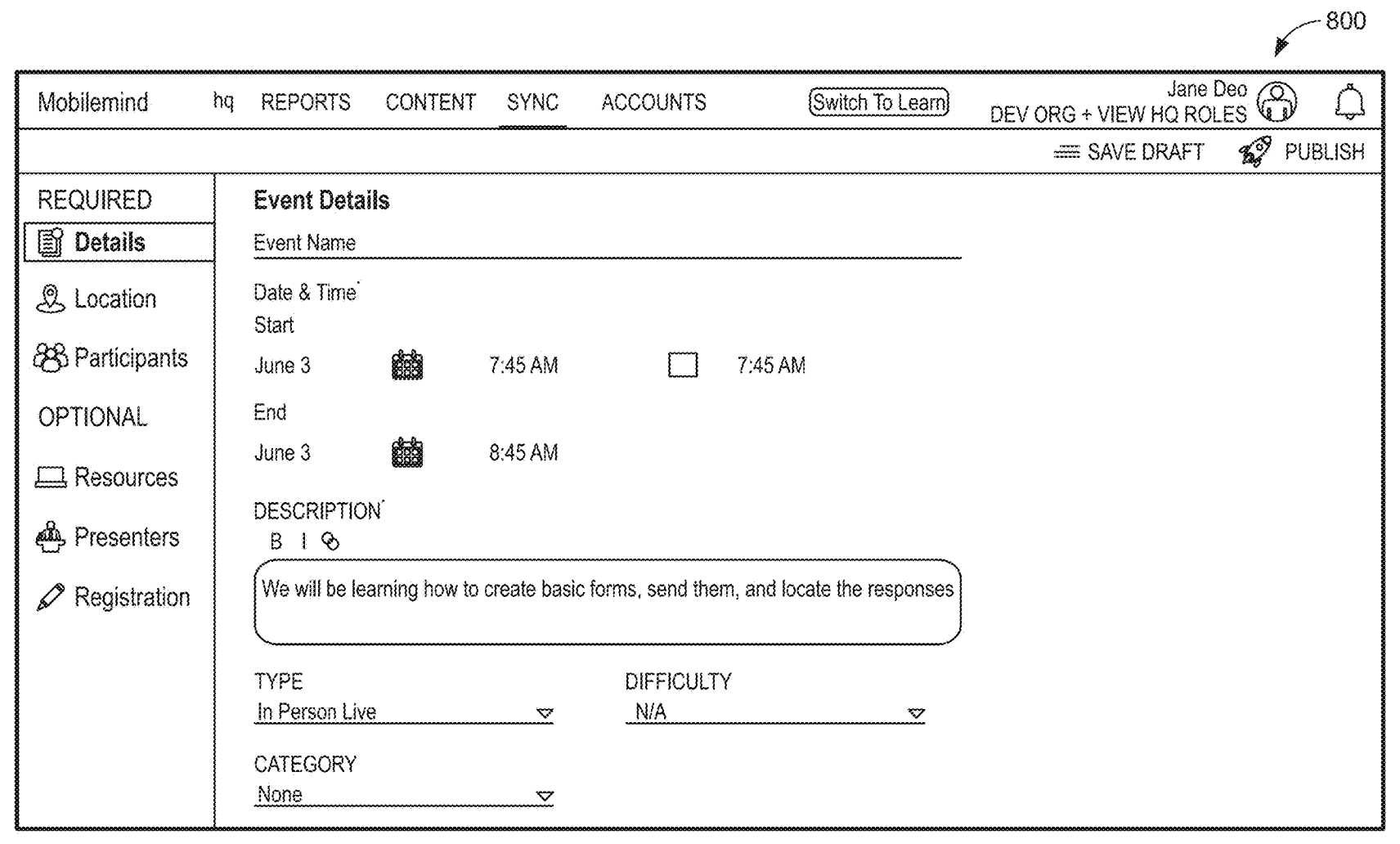

Referring now to FIG. 8, illustrated is a user interface of an event creation portal 800, according to one embodiment of the present disclosure. In various embodiments, the local application 128 can include the event creating portal 800. The event creating portal 800 can receive information regarding an event. For example, the event creation portal 800 can receive information including, but not limited to, event name, start date, start time, description, type, difficulty, category, location, and participants.

Figure 9:
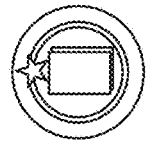
FIG. 9 illustrates a user interface for a created event, according to one embodiment of the present disclosure.

Referring now to FIG. 9, illustrated is a user interface for a created event 900, according to one embodiment of the present disclosure. In various embodiment, the local application 128 can include the created event 800. The created event 800 can include a field to submit the presence code to join the particular event. In various embodiments, the client device 106 can manage the created event 800 after it has been created.

Referring now to FIG. 10, illustrated is a user interface of a course creation page 1000, according to one embodiment of the present disclosure. The local application 128 can include the course creation page 1000 for creating courses. In some embodiments, the course creation page 1000 can include a field for a description, a video, a link, a category, a school district, a science field type, a skill level, an estimated time to complete, and any particular field for designing a course.

Referring now to FIG. 11, illustrated is a user interface for a community portal 1100, according to one embodiment of the present disclosure. In some embodiments, the local application 128 can receive the community data 169 from the computing environment 103. The local application 128 can display the community data 169 on the community portal 1100. The community portal 1100 can facilitate providing access to client devices 106 the community course and/or events created by other client devices 106.

Figure 12:
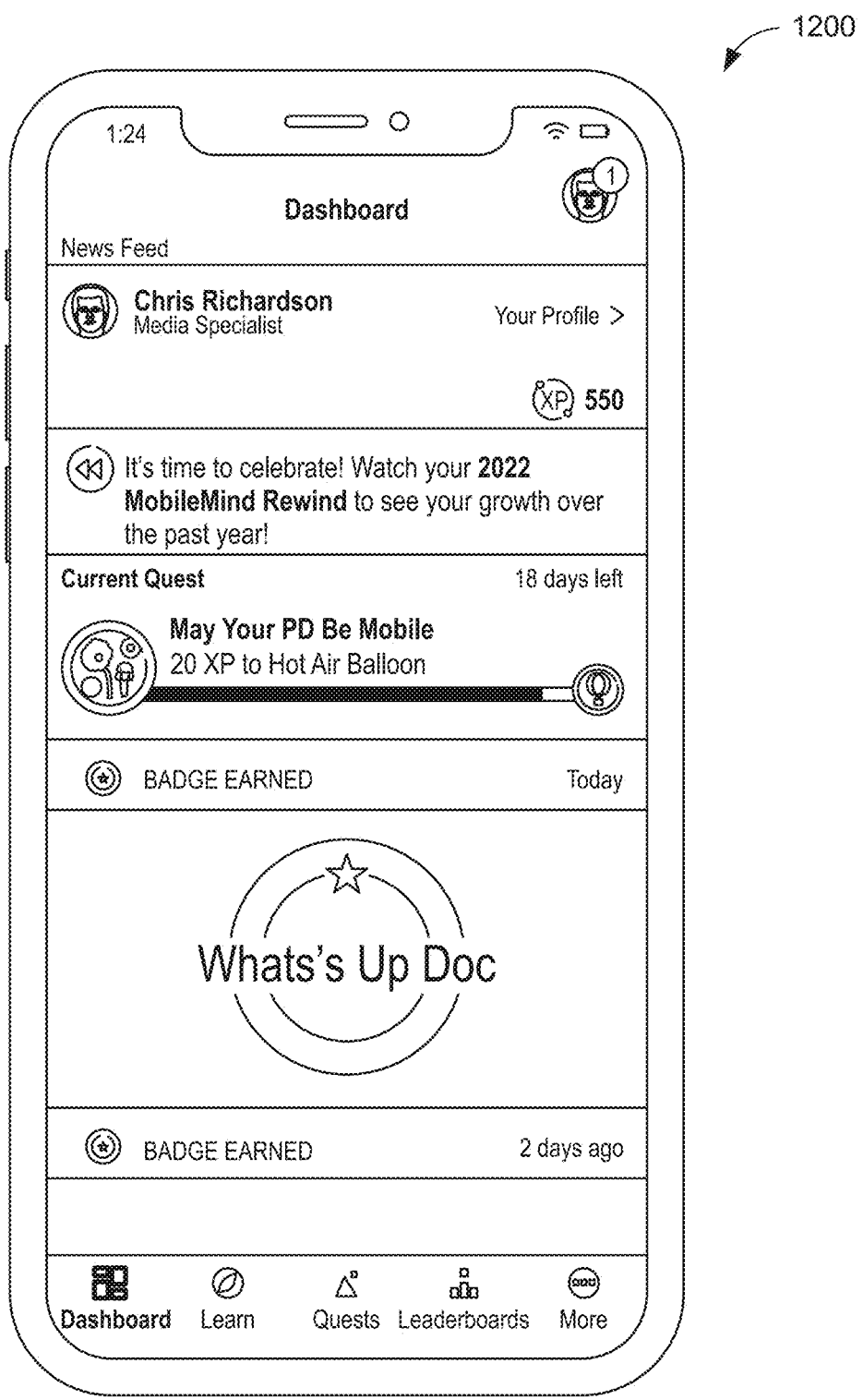
FIG. 12 illustrates a user interface of a dashboard, according to one embodiment of the present disclosure.

Referring now to FIG. 12, illustrated is a user interface of a mobile dashboard 1200, according to one embodiment of the present disclosure. In some embodiments, the mobile dashboard 1200 is dedicated for a cellular device. The mobile dashboard 1200 can display incomplete learning paths, profile information, past classes and education information, and explore earned badges. In at least one embodiment, the mobile dashboard 1200 includes selectable fields that direct the client device 106 to various different resources. In some embodiments, the learning path, course, lesson, tutorial, test, and/or any particular tool incorporated into the learning environment can be accessed through the mobile dashboard 1200. For example, a course can be commenced and completed through the cellular device of the associated user. In another example, a course can be commenced on a cellular device of the associated user and completed on the desktop of the associated user. In another example, a course can be commenced on a desktop of the associated user and completed on the cellular device of the associated user.

Figure 13:
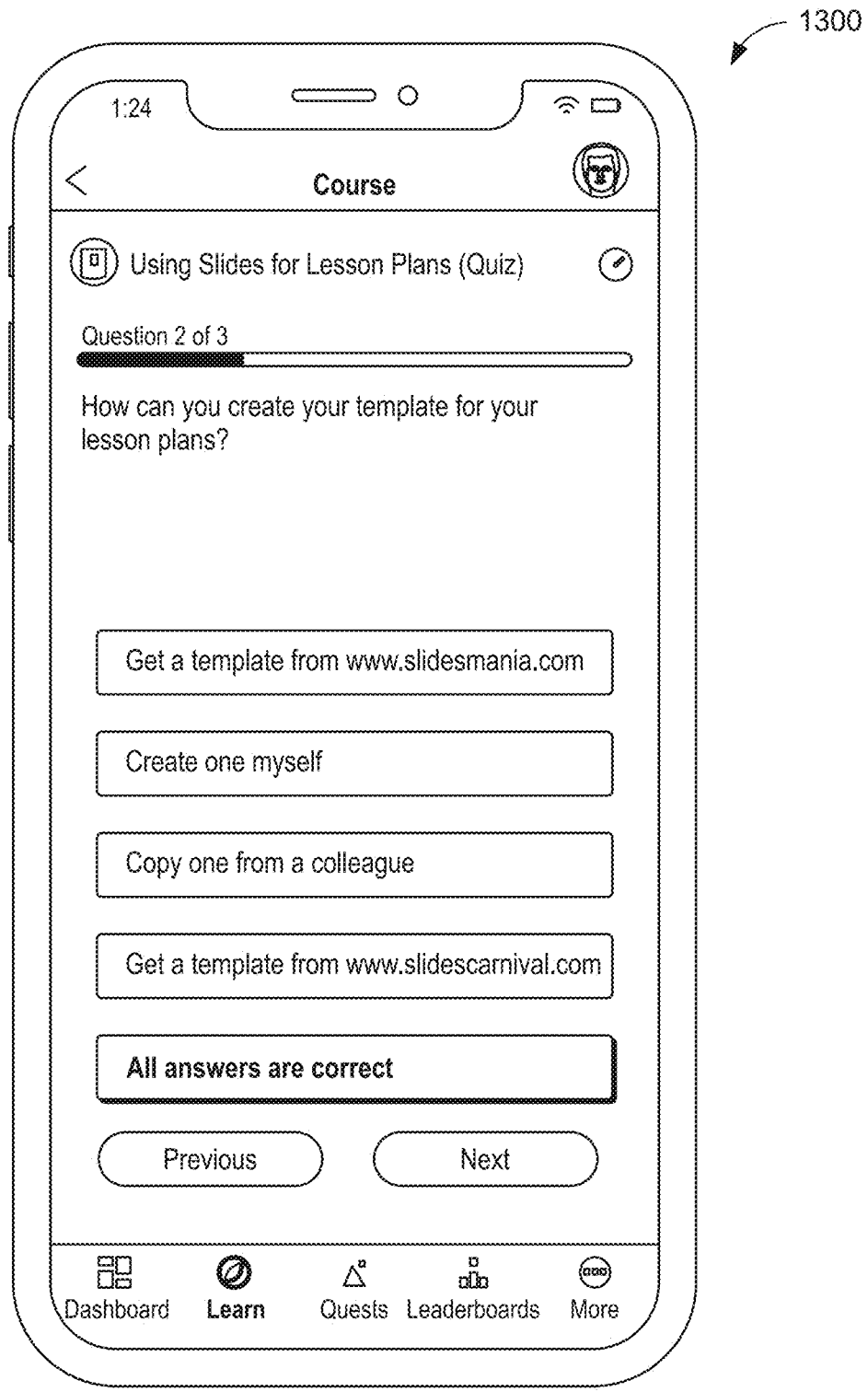
FIG. 13 illustrates a user interface of a mobile course, according to one embodiment of the present disclosure.

Referring now to FIG. 13, illustrated is a user interface of a mobile course 1300, according to one embodiment of the present disclosure. In some embodiments, the client device 106 can display course and exams. In at least one embodiment, the client device 106 can receive responses made to a course exam. The client device 106 can produce instructions based on the responses made on the client device 106. For example, if the user selects the wrong answer in a multiple choice selection, the client device 106 can automatically provide a hint by surfacing the hint on the display through the web extension 131. In at least one embodiment, automatically can be defined as a process performed by a computing device with little to no human activity.

Figure 14:
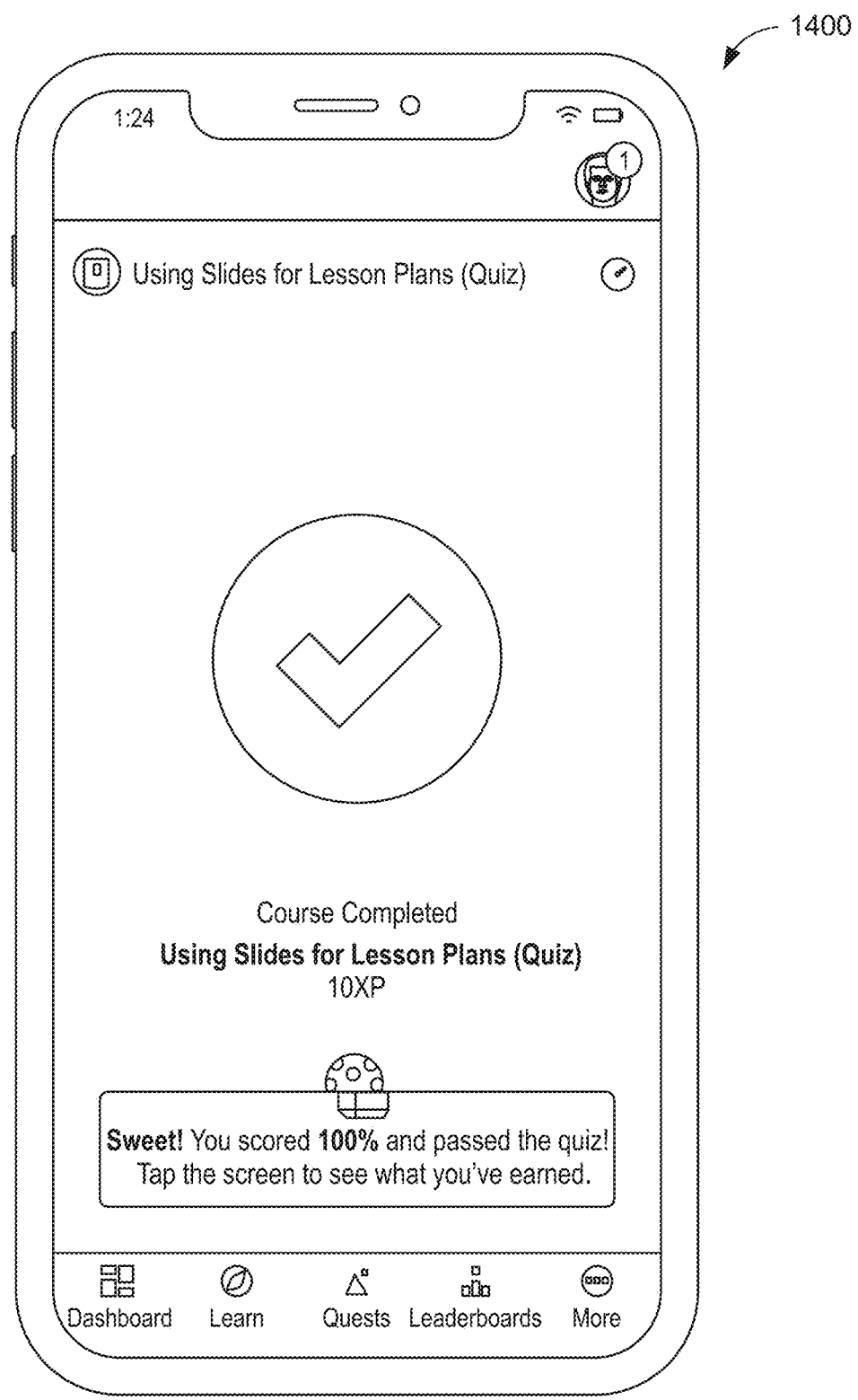
FIG. 14 illustrates a user interface of a completed course, according to one embodiment of the present disclosure.

Referring now to FIG. 14, illustrated is a user interface of a completed course 1400, according to one embodiment of the present disclosure. The client device 106 can surface the completion of a course with details on the completion. For example, the competed course 1400 can include information on passage or failure, amount of experience gained from the course, and amount of points accumulated from the course. The client device 106 can surface similar information regarding singular tests pertaining to one or more courses and/or learning paths.

Figure 15:
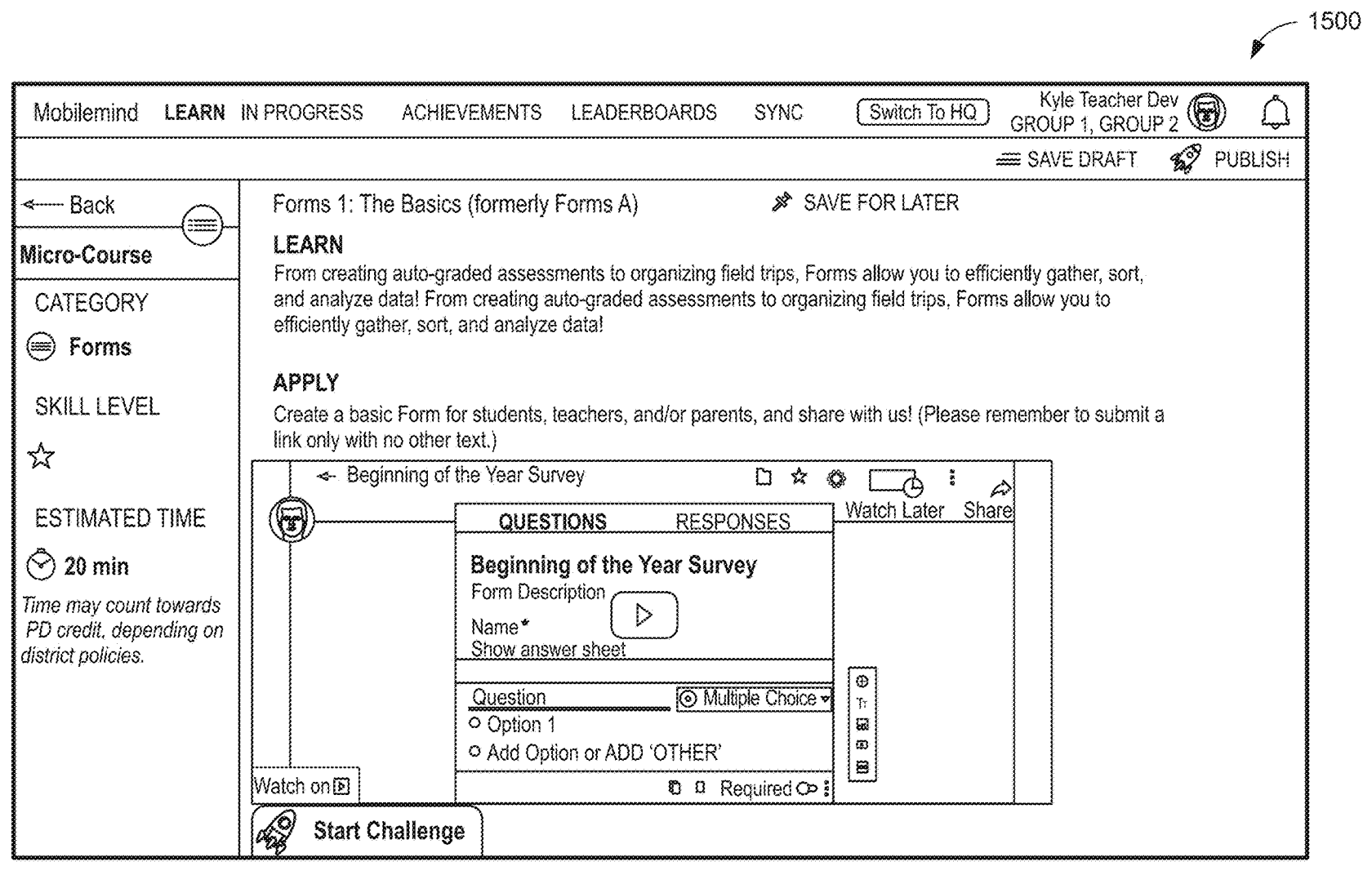

Referring now to FIG. 15, illustrated is a user interface of a course page 1500, according to one embodiment of the present disclosure. In at least one embodiment, the local application 128 can include at least one course page 1500 for highlighting particular courses. For example, the client device 106 can render the course page 1500 for an Adobe acrobat course. The course page can include, but is not limited to, a description, the field of study, a video, time estimate, skill level, and category.

Figure 16:
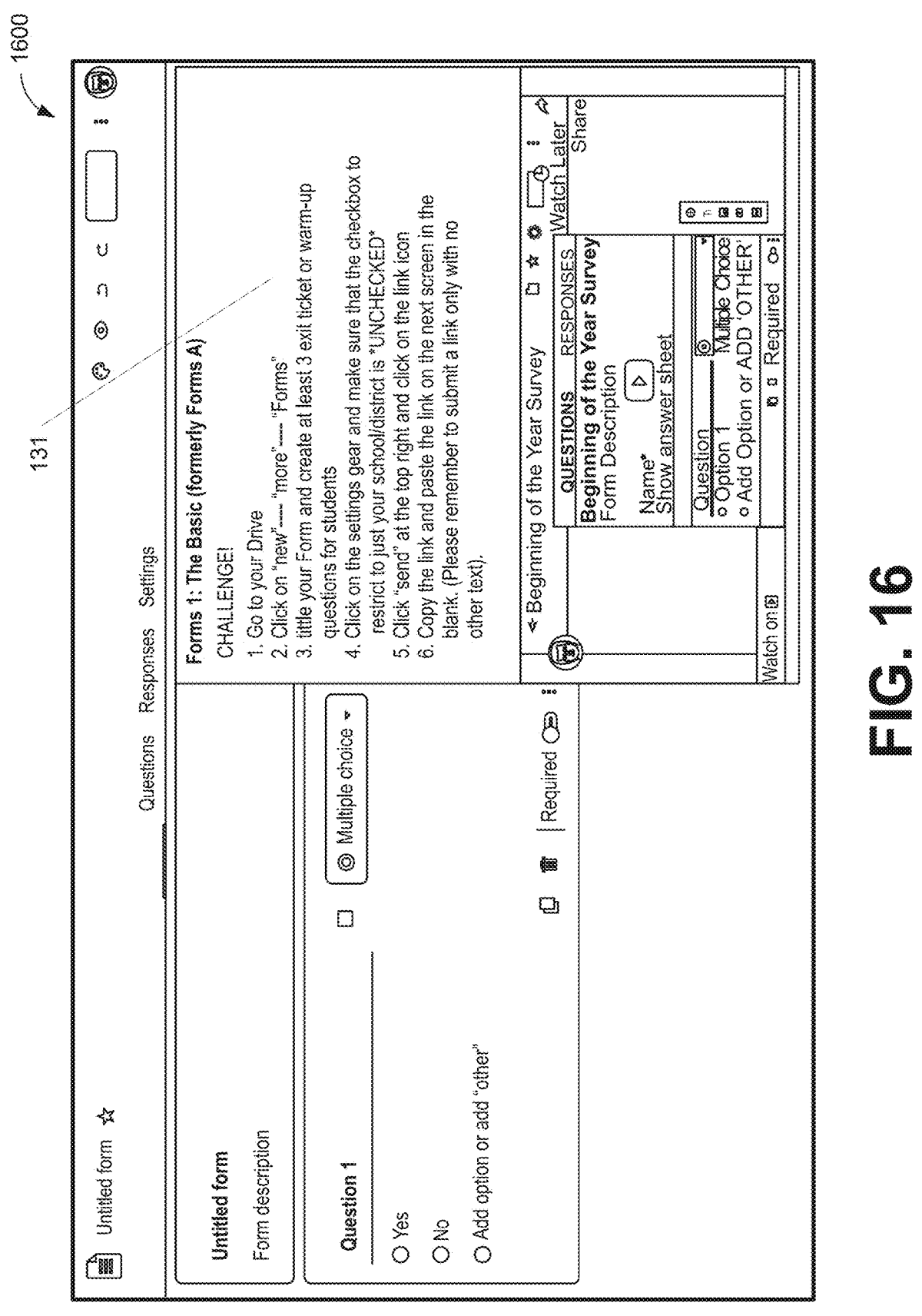

Referring now to FIG. 16, illustrated is a user interface of an in-progress course 1600, according to one embodiment of the present disclosure. The client device 106 can surface the web extension 131 when the client device 106 is in the in-progress course 1600. The web extension 131 can include step descriptions, videos, and tips for completing the in-progress course 1600.

Figure 17:
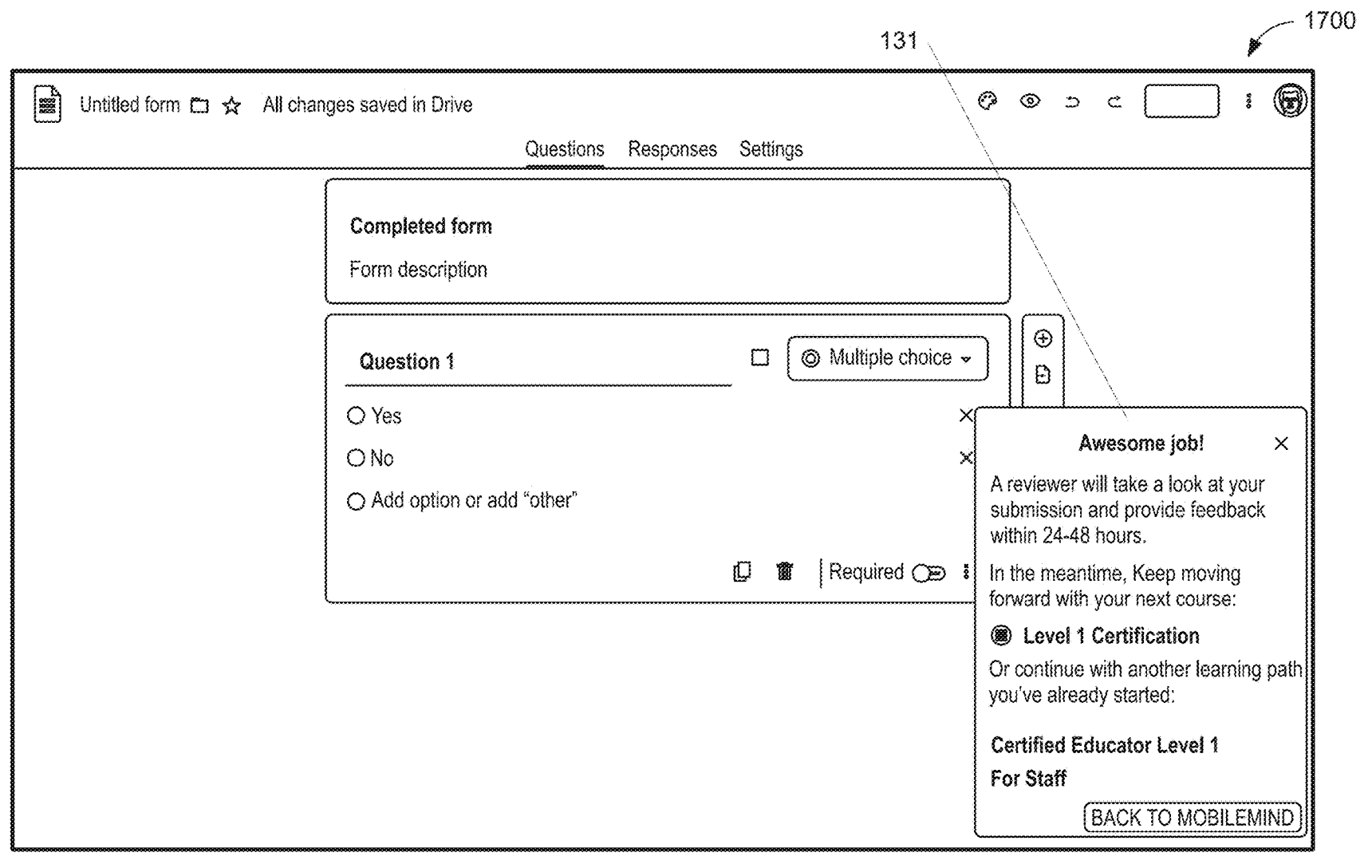

Referring now to FIG. 17, illustrated is a user interface of a completed course 1700, according to one embodiment of the present disclosure. The client device 106 can update the web extension 131 to prompt the completed course 1700. In some embodiments, the web extension 131 can provide grading scores, certification, and any information pertaining to the completion of a course. The web extension 131 can close at the completion of the particular course. For example, the client device 106 can close the web extension 131 and revert to the local application 128 at the completion of the particular course.

Figure 18:
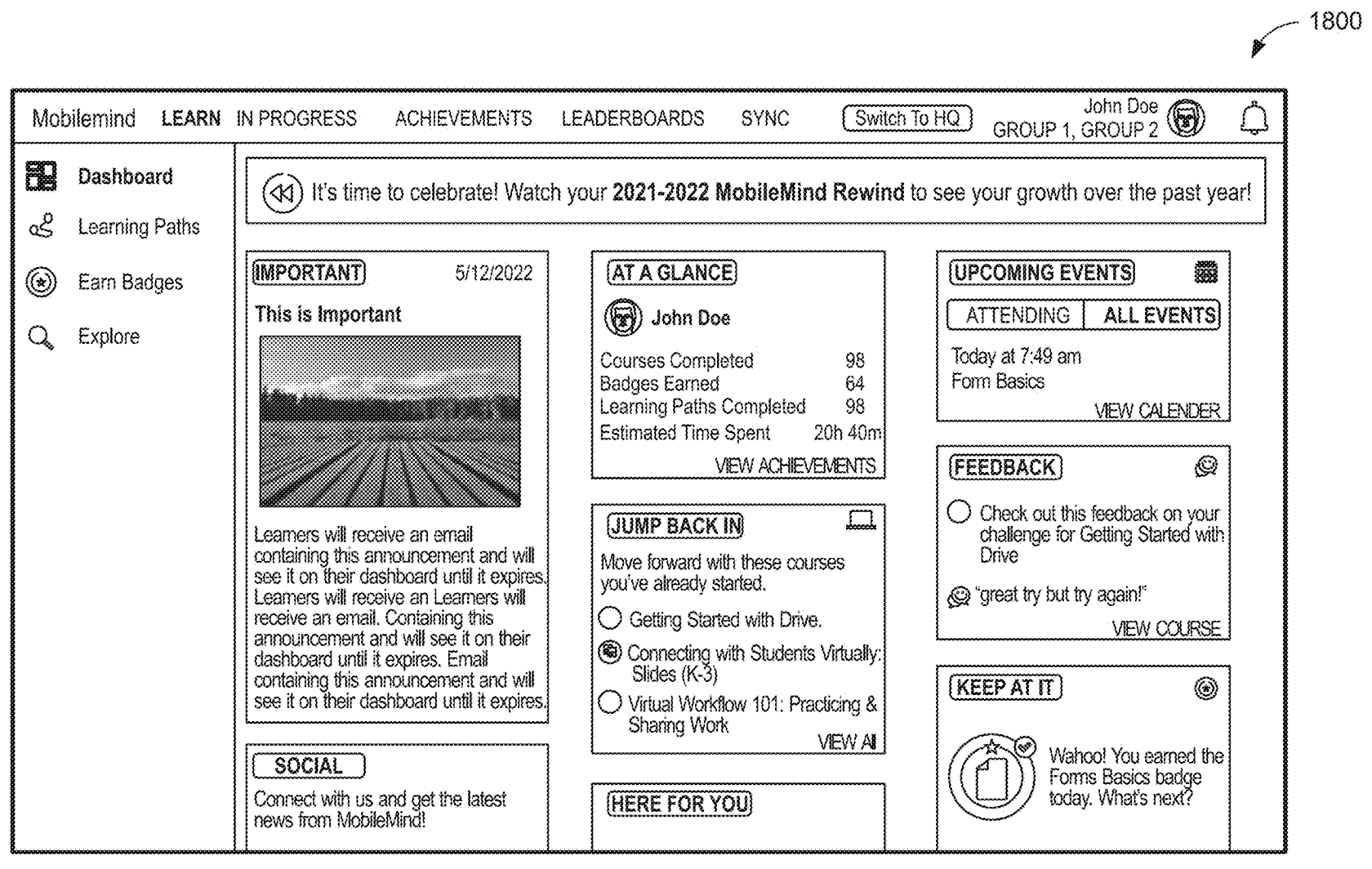

Referring now to FIG. 18, illustrated is a user interface of a dashboard 1800, according to one embodiment of the present disclosure. The local application 128 can display various aspects of the learning environment through the dashboard 1800. For example, the dashboard 1800 can display incomplete course, completed course, recommended course and learning paths, future events, current learning progress, feedback notifications, community information, and/or any other information pertaining to the learning environment.

Figure 19:
FIG. 19 illustrates a user interface of an event page, according to one embodiment of the present disclosure.

Referring now to FIG. 19, illustrated is a user interface of an event page 1900, according to one embodiment of the present disclosure. The local application 128 can render the event page 1900 to highlight particular events associated with the user account. In particular embodiments, the event page 1900 can display current events, future events, private events, and completed events. The event page 1900 can display completion times associated with the particular events. In various embodiments, the client device 106 can receive updated community data 169 at particular time intervals to update current and future events on the events page 1900.

The foregoing description of the exemplary embodiments has been presented only for the purposes of illustration and description and is not intended to be exhaustive or to limit the innovations to the precise forms disclosed. Many modifications and variations are possible in light of the above teaching.

Disjunctive language such as the phrase "at least one of X, Y, or Z," unless specifically specified otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Language such as "based on" unless specifically specified otherwise, is otherwise understood to included "based at least in part on." For the purposes of this application, the term automatically can refer to functionality being performed by a computing device with substantially no user interaction or no user interaction being required.

The embodiments were chosen and described in order to explain the principles of the innovations and their practical application so as to enable others skilled in the art to utilize the innovations and various embodiments and with various modifications as are suited to the particular use contemplated. Alternative embodiments will become apparent to those skilled in the art to which the present innovations pertain without departing from their spirit and scope.

What is claimed:

1. A training system, comprising:
   a data store comprising training data for a plurality of courses, a particular course of the plurality of courses comprising a tutorial for using at least one of: a third party target application and a third party site accessed via a web browser; and
   at least one computing device in communication with the data store, the at least one computing device being configured to:
   identify, via a software extension, the tutorial of the particular course corresponding to at least one of: the third party target application or the third party site accessed via the web browser based on at least one of: the third party target application or the third party site;
   identify, via the software extension, a subset of the training data associated with the tutorial of the particular course based on an application programming interface (API) call to initiate the tutorial received from at least one of: the third party target application or the third party site accessed via the web browser;

determine, via the software extension, that the tutorial of the particular course is in progression on the at least one of: the third party target application or the web browser executed by the at least one computing device by analyzing the subset of the training data associated with the tutorial of the particular course;

render, via the software extension, at least one user interface tool on a display of the at least one computing device within least one of: the third party target application or the third party site based on the progression of the tutorial of the particular course;

determine a plurality of steps extracted from the training data and associated with the tutorial of the particular course;

monitor, via the software extension, for at least one input into a plurality of input fields associated with a particular step from the plurality of steps by extracting the at least one input from a script produced by at least one of: the third party target application or the third party site via the web browser;

determine, via the software extension, a failure threshold has been exceeded for the particular step of the plurality of steps based on the at least one input;

generate at least one instruction for completion of the particular step based on the training data; and render, via the software extension, the at least one instruction on the display of the at least one computing device.

2. The training system of claim 1, wherein the at least one computing device is further configured to:
determining that the tutorial of the particular course is in progression; and
in response to determining that the tutorial is in progression, extract the training data from the data store.

3. The training system of claim 1, wherein the at least one computing device is further configured to:
identify a user account associated with the at least one computing device; and
determine that the tutorial of the particular course is in progression by the user account.

4. The training system of claim 3, wherein the at least one computing device is further configured to:
determine that the plurality of steps have been successfully finished; and
mark the particular course as finished by the user account in the data store.

5. The training system of claim 3, wherein the at least one computing device is further configured to:
analyze a plurality of inputs associated with the plurality of steps based on the training data to generate at least one grading score for the particular course; and
assign a course completion grade to the particular course for the user account based on the at least one grading score.

6. The training system of claim 1, wherein the training data further comprises at least one of: test data, user usage data, HTML files, JSON files, scripts, and lesson data.

7. The training system of claim 1, wherein the software extension comprises a browser extension and the tutorial is performed via the web browser.

8. The training system of claim 1, wherein at least one computing device is further configured to communicate with the at least one of: the target application or the web browser via the API to extract the subset of the training data associated with the tutorial.

9. A method, comprising:
identifying, via a software extension, the tutorial of the particular course corresponding to at least one of: a third party target application or a third party site accessed via a web browser based on at least one of: the third party target application or the third party site;

identifying, via the software extension, a subset of training data associated with a tutorial of a particular course based on an application programming interface (API) call to initiate the tutorial received from at least one of: the third party target application or the third party site accessed via the web browser;

determining, via the software extension executed by at least one computing device, that the tutorial of the particular course of a plurality of courses is in progression on at least one of: the third party target application or the web browser executed by the at least one computing device by analyzing the subset of the training data associated with the tutorial of the particular course;

rendering, via the software extension, at least one user interface tool on a display of the at least one computing device within least one of: the third party target application or the third party site based on the progression of the tutorial of the particular course;

determining, via the at least one computing device, a plurality of steps extracted from training data and associated with the tutorial of the particular course;

monitoring, via the software extension, for at least one input into a plurality of input fields associated with a particular step from the plurality of steps by extracting the at least one input from a script produced by at least one of: the third party target application or the third party site via the web browser;

determining, via the software extension, a failure threshold has been exceeded for the particular step of the plurality of steps based on the at least one input;

generating, via the at least one computing device, at least one instruction for completion of the particular step based on the training data for the plurality of courses; and rendering, via the software extension, the at least one instruction on the display of the at least one computing device.

10. The method of claim 9, further comprising:
analyzing, via the at least one computing device, a plurality of finished courses of the plurality of courses associated with a user account; and
generating, via the at least one computing device, at least one recommended course of the plurality of courses based on the plurality of finished courses.

11. The method of claim 10, further comprising:
training, via the at least one computing device, a machine learning model using historical data comprising a plurality of sets of finished courses individually associated with a respective one of a plurality of user accounts; and
generating, via the at least one computing device, a plurality of scores individually corresponding to a respective one of a plurality of unfinished course for the user account by applying the machine learning model, wherein the at least one recommended course is generated based on the plurality of scores.

12. The method of claim 10, further comprising generating at least one learning path comprising a recommended plurality of sequential courses of the plurality of courses for the user account.

13. The method of claim 9, further comprising collecting, via the software extension, the at least one input by communicating with the at least one of: the third party target application or the web browser via an API.

14. The method of claim 9, further comprising:
generating, via the at least one computing device, a sharable schedule for the particular course; and
sending, via the at least one computing device, the sharable schedule to at least one second computing device for the at least one second computing device to finished the particular course.

15. A non-transitory computer-readable medium embodying a program that, when executed by at least one computing device, causes the at least one computing device to:
identifying, via a software extension, the tutorial of the particular course corresponding to at least one of: a third party target application or a third party site accessed via a web browser based on at least one of: the third party target application or the third party site;
identifying, via the software extension, a subset of training data associated with a tutorial of a particular course based on an application programming interface (API) call to initiate the tutorial received from at least one of: the third party target application or the third party site accessed via the web browser;
determine that the tutorial of the particular course of a plurality of courses is in progression on at least one of: the third party target application or the web browser executed by the at least one computing device by analyzing the subset of the training data associated with the tutorial of the particular course;
rendering, via the software extension, at least one user interface tool on a display of the at least one computing device within least one of: the third party target application or the third party site based on the progression of the tutorial of the particular course;
determine a plurality of steps extracted from training data and associated with the tutorial of the particular course;
monitor for at least one input into a plurality of input fields associated with a particular step from the plurality of steps by extracting the at least one input from a script produced by at least one of: the third party target application or the third party site via the web browser;
determine a failure threshold has been met or exceeded for the particular step of the plurality of steps based on the at least one input;
generate at least one instruction for completion of the particular step based on the training data for the plurality of courses; and
render the at least one instruction on the display of the at least one computing device.

16. The non-transitory computer-readable medium of claim 15, wherein the program further causes the at least one computing device to:
subsequent to rendering the at least one instruction, determine a second failure threshold has been met or exceeded for the particular step; and
in response to the second failure threshold being met or exceeded, perform at least one action to assist in completing the particular step on behalf of a user account.

17. The non-transitory computer-readable medium of claim 16, wherein the at least one action comprises at least one of: moving a mouse cursor, entering a series of key strokes, and rendering at least one indicator on the display.

18. The non-transitory computer-readable medium of claim 16, wherein the program further causes the at least one computing device to determining an interaction with a particular user interface component in a user interface necessary to finished the particular step, wherein the at least one action comprises rendering an overlay of the interaction with the particular user interface component.

19. The non-transitory computer-readable medium of claim 16, wherein the program further causes the at least one computing device to generate a grade for the particular course in response to determining that a user account indicates that the plurality of steps have been finished.

20. The non-transitory computer-readable medium of claim 15, wherein the program comprises a browser extension associated with the web browser.

* * * * *